US012744573B2

(12) United States Patent
Matsumura et al.

(10) Patent No.: US 12,744,573 B2
(45) Date of Patent: Sep. 22, 2026

(54) TERMINAL, RADIO COMMUNICATION METHOD AND BASE STATION

(71) Applicant: NTT DOCOMO, INC., Tokyo (JP)

(72) Inventors: Yuki Matsumura, Tokyo (JP); Nadisanka Rupasinghe, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 491 days.

(21) Appl. No.: 17/996,566

(22) PCT Filed: Apr. 19, 2021

(86) PCT No.: PCT/JP2021/015801
§ 371 (c)(1), (2) Date: Oct. 19, 2022

(87) PCT Pub. No.: WO2021/215377
PCT Pub. Date: Oct. 28, 2021

(65) Prior Publication Data

US 2023/0231606 A1 Jul. 20, 2023

(30) Foreign Application Priority Data

Apr. 20, 2020 (JP) ................................ 2020-074780

(51) Int. Cl.
*H04B 7/06* (2006.01)

(52) U.S. Cl.
CPC .................................. *H04B 7/0626* (2013.01)

(58) Field of Classification Search
CPC .. H04B 7/0626; H04B 7/0456; H04B 7/0628; H04L 5/001; H04L 5/0057; H04L 5/0094; H04W 24/10; H04W 72/04; H04W 76/15
See application file for complete search history.

(56) References Cited

U.S. PATENT DOCUMENTS

2018/0102817 A1* 4/2018 Park ..................... H04B 7/0417
2020/0351858 A1* 11/2020 Tsai ..................... H04W 72/20

OTHER PUBLICATIONS

Office Action issued in Chinese Patent Application No. 202180044107.4, issued Apr. 23, 2025 (20 pages).
3GPP TSG-RAN WG1 #100b-e; R1-2002704; 3GPP TSG RAN1 Chairman; "RAN1#100b-e preparation phase on incoming LS"; e-Meeting, Apr. 20-30, 2020 (15 pages).
Office Action issued in Japanese Application No. 2022-517023, mailed Dec. 3, 2024 (6 pages).

(Continued)

*Primary Examiner* — Thomas R Cairns
*Assistant Examiner* — Raenita Ann Fenner
(74) *Attorney, Agent, or Firm* — Osha Bergman Watanabe & Burton LLP

(57) ABSTRACT

In order to appropriately perform communication using information related to a channel state information reference signal reported from a terminal, a terminal according to one aspect of the present disclosure includes a control section that controls reporting of a plurality of pieces of first information related to a combination of a channel state information resource for a band combination and the number of ports for the band combination and second information related to the number of ports per channel state information resource for the band combination, and a transmitting section that transmits the first information and the second information.

3 Claims, 25 Drawing Sheets

FIRST PARAMETER PER BAND
(FG2-36/2-40/2-41/2-43)

SECOND PARAMETER PER BC
(UPDATED FG2-33)

(56) References Cited

OTHER PUBLICATIONS

3GPP TSG RAN WG1#100-e-Bis; R1-2002100 "Draft Reply to RAN2 LS on CSI-RS capabilities (FG 2-33/36/40/41/43)" e-Meeting; Apr. 20-30, 2020 (3 pages).
3GPP TSG RAN WG1 Meeting #100bis-e; R1-2002673 "Discussion on Reply LS on CSI-RS capabilities (FG 2-33/36/40/41/43)" Huawei, HiSilicon; E-meeting; Apr. 20-30, 2020 (4 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2021/015801, mailed Jun. 22, 2021 (3 pages).
Written Opinion issued in International Application No. PCT/JP2021/015801; Dated Jun. 22, 2021 (3 pages).

* cited by examiner

CA-ParametersNR-v1540 per band combination

```
CA-ParametersNR-v1540 ::=          SEQUENCE {
    simultaneousSRS-AssocCSI-RS-AllCC                     INTEGER (5..32)         OPTIONAL,
    csi-RS-IM-ReceptionForFeedbackPerBandComb             SEQUENCE {
        maxNumberSimultaneousNZP-CSI-RS-ActBWP-AllCC          INTEGER (1..64)         OPTIONAL,
        totalNumberPortsSimultaneousNZP-CSI-RS-ActBWP-AllCC   INTEGER (2..256)        OPTIONAL
    }                                                                             OPTIONAL,
    simultaneousCSI-ReportsAllCC                          INTEGER (5..32)         OPTIONAL,
    dualPA-Architecture                                   ENUMERATED {supported}  OPTIONAL
}
```

FIG. 1

CodebookParameters per band

```
CodebookParameters ::=              SEQUENCE {
    type1                               SEQUENCE {
        singlePanel                         SEQUENCE {
            supportedCSI-RS-ResourceList        SEQUENCE (SIZE (1.. maxNrofCSI-RS-Resources)) OF SupportedCSI-RS-Resource,
            modes                                   ENUMERATED {mode1, mode1andMode2},
            maxNumberCSI-RS-PerResourceSet      INTEGER (1..8)
        },
        multiPanel                          SEQUENCE {
            supportedCSI-RS-ResourceList        SEQUENCE (SIZE (1.. maxNrofCSI-RS-Resources)) OF SupportedCSI-RS-Resource,
            modes                                   ENUMERATED {mode1, mode2, both},
            nrofPanels                              ENUMERATED {n2, n4},
            maxNumberCSI-RS-PerResourceSet      INTEGER (1..8)
        }                                                                                                   OPTIONAL
    },
    type2                               SEQUENCE {
        supportedCSI-RS-ResourceList        SEQUENCE (SIZE (1.. maxNrofCSI-RS-Resources)) OF SupportedCSI-RS-Resource,
        parameterLx                             INTEGER (2..4),
        amplitudeScalingType                  ENUMERATED {wideband, widebandAndSubband},
        amplitudeSubsetRestriction            ENUMERATED {supported}              OPTIONAL
    }                                                                                                       OPTIONAL,
    type2-PortSelection                 SEQUENCE {
        supportedCSI-RS-ResourceList        SEQUENCE (SIZE (1.. maxNrofCSI-RS-Resources)) OF SupportedCSI-RS-Resource,
        parameterLx                                 INTEGER (2..4),
        amplitudeScalingType                      ENUMERATED {wideband, widebandAndSubband}
    }                                                                                                       OPTIONAL
}

SupportedCSI-RS-Resource ::=        SEQUENCE {
    maxNumberTxPortsPerResource         ENUMERATED {p2, p4, p8, p12, p16, p24, p32},
    maxNumberResourcesPerBand           INTEGER (1..64),
    totalNumberTxPortsPerBand           INTEGER (2..256)
}
```

FIG. 2

| | BAND A | BAND B | PRESENCE OR ABSENCE OF SUPPORT |
|---|---|---|---|
| CONFIGURATION #1 | P/AP CSI-RS:{1,4} | P/AP CSI-RS:{1,8} | PRESENCE |
| CONFIGURATION #2 | P/AP CSI-RS:{1,8} | P/AP CSI-RS:{1,4} | PRESENCE |
| CONFIGURATION #3 | AP CSI-RS:{1,12} | AP CSI-RS:{1,12} | PRESENCE |
| CONFIGURATION #4 | P/AP CSI-RS:{1,16} | N/A | ABSENCE (EXCESS OF UE CAPABILITY LIMIT) |
| CONFIGURATION #5 | N/A | P/AP CSI-RS:{1,16} | ABSENCE (EXCESS OF UE CAPABILITY LIMIT) |

FIG. 4

FIRST PARAMETER PER BAND
(FG2-36/2-40/2-41/2-43)
{16, 1, 16},
{8, 2, 12}
{16, 1, 16},
{8, 2, 12}
BAND A
BAND B
BAND A+B = {2, 12}
SECOND PARAMETER PER BC
(FG2-33)

FIRST PARAMETER PER BAND
(FG2-36/2-40/2-41/2-43)
{16, 1, 16},
{8, 2, 12}
{16, 1, 16},
{8, 2, 12}
BAND A
BAND B
BAND A+B = {1, 16}, {2, 12}
SECOND PARAMETER PER BC
(UPDATED FG2-33)

FIG. 6A

```
CA-ParametersNR-vxxx ::=          SEQUENCE {
    simultaneousSRS-AssocCSI-RS-AllCC                        INTEGER (5..32)        OPTIONAL,
    csi-RS-IM-ReceptionForFeedbackPerBandComb                SEQUENCE {
       maxNumberSimultaneousNZP-CSI-RS-ActBWP-AllCCList SEQUENCE (SIZE (1.. maxNrofCSI-RS-ResourcesperBC)) OF
         maxNumberSimultaneousNZP-CSI-RS-ActBWP-AllCC,
       totalNumberPortsSimultaneousNZP-CSI-RS-ActBWP-AllCCList SEQUENCE (SIZE (1.. maxNrofCSI-RS-
         ResourcesperBC)) OF totalNumberPortsSimultaneousNZP-CSI-RS-ActBWP-AllCC,
       maxNumberSimultaneousNZP-CSI-RS-ActBWP-AllCC              INTEGER (1..64)        OPTIONAL,
       totalNumberPortsSimultaneousNZP-CSI-RS-ActBWP-AllCC       INTEGER (2..256)       OPTIONAL
    }                                                                               OPTIONAL,
    simultaneousCSI-ReportsAllCC                             INTEGER (5..32)        OPTIONAL,
    dualPA-Architecture                                      ENUMERATED {supported}  OPTIONAL
}
```

FIG. 6B

```
CA-ParametersNR-vxxx ::=          SEQUENCE {
    simultaneousSRS-AssocCSI-RS-AllCC                        INTEGER (5..32)        OPTIONAL,
    csi-RS-IM-ReceptionForFeedbackPerBandComb                SEQUENCE {
       maxNumberSimultaneousNZP-CSI-RS-ActBWP-AllCCList SEQUENCE (SIZE (1.. maxNrofCSI-RS-ResourcesperBC)) OF
         INTEGER (1..64),
       totalNumberPortsSimultaneousNZP-CSI-RS-ActBWP-AllCCList SEQUENCE (SIZE (1.. maxNrofCSI-RS-
         ResourcesperBC)) OF INTEGER (2..256),
}                                                                               OPTIONAL,
    simultaneousCSI-ReportsAllCC                             INTEGER (5..32)        OPTIONAL,
    dualPA-Architecture                                      ENUMERATED {supported}  OPTIONAL
}
```

FIG. 7A

```
CA-ParametersNR-vxxx ::=            SEQUENCE {
    simultaneousSRS-AssocCSI-RS-AllCC                       INTEGER (5..32)         OPTIONAL,
      csi-RS-IM-ReceptionForFeedbackPerBandCombList SEQUENCE (SIZE (1.. maxNrofCSI-RS-ResourcesperBC)) OF csi-
         RS-IM-ReceptionForFeedbackPerBandComb,

    csi-RS-IM-ReceptionForFeedbackPerBandComb               SEQUENCE {
       maxNumberSimultaneousNZP-CSI-RS-ActBWP-AllCC            INTEGER (1..64)         OPTIONAL,
       totalNumberPortsSimultaneousNZP-CSI-RS-ActBWP-AllCC     INTEGER (2..256)        OPTIONAL
    }                                                                              OPTIONAL,
    simultaneousCSI-ReportsAllCC                            INTEGER (5..32)         OPTIONAL,
    dualPA-Architecture                                     ENUMERATED {supported}  OPTIONAL
}
```

FIG. 7B

```
CA-ParametersNR-v1540List SEQUENCE (SIZE (1.. maxNrofCSI-RS-ResourcesperBC)) OF CA-ParametersNR-v1540,
```

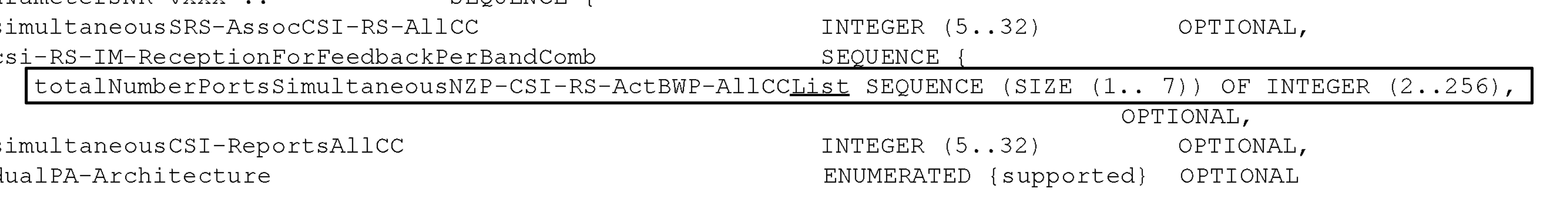
```
CA-ParametersNR-vxxx ::=            SEQUENCE {
    simultaneousSRS-AssocCSI-RS-AllCC                              INTEGER (5..32)         OPTIONAL,
    csi-RS-IM-ReceptionForFeedbackPerBandComb                      SEQUENCE {
      totalNumberPortsSimultaneousNZP-CSI-RS-ActBWP-AllCCList SEQUENCE (SIZE (1.. 7)) OF INTEGER (2..256),
}                                                                                  OPTIONAL,
    simultaneousCSI-ReportsAllCC                                   INTEGER (5..32)         OPTIONAL,
    dualPA-Architecture                                            ENUMERATED {supported}  OPTIONAL
}
```
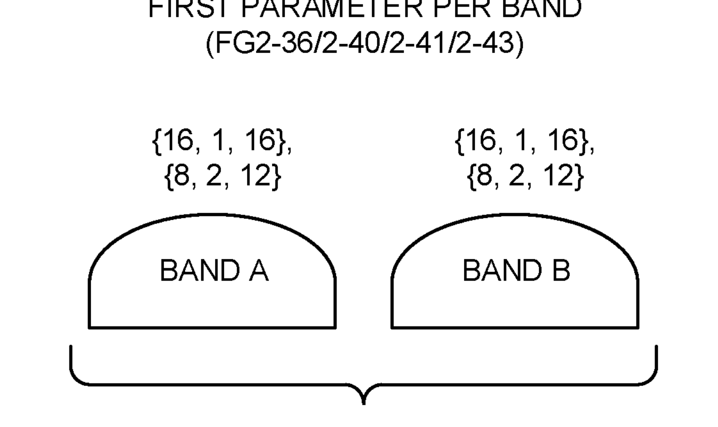
FIG. 10

| MAXIMUM NUMBER OF CSI-RS RESOURCES | TOTAL NUMBER OF PORTS |
|---|---|
| 1 | 16 |
| 2 | 12 |
| 3 | 8 |

REPORT MAXIMUM VALUE OF CSI-RS RESOURCES WITH DIFFERENT VALUES

FIG. 14

| MAXIMUM NUMBER OF CSI-RS RESOURCES | TOTAL NUMBER OF PORTS |
|---|---|
| 2 | 12 |
| 3 | 8 |
| 4 | 6 |

DO NOT REPORT CSI-RS RESOURCE WITH MAXIMUM VALUE 1

FIG. 15

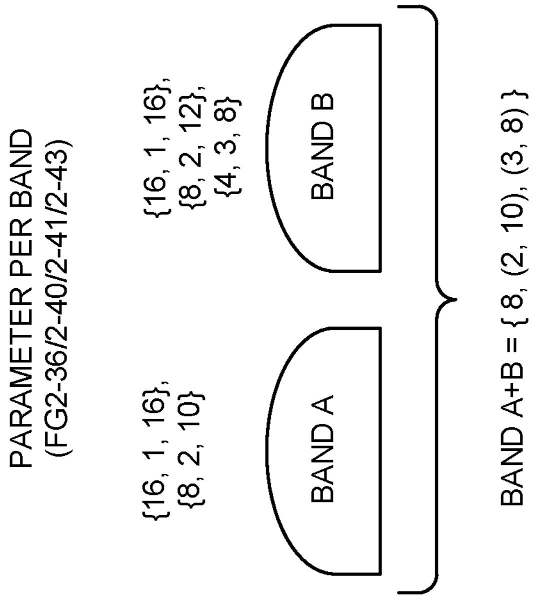
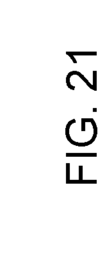
FIG. 21

TERMINAL, RADIO COMMUNICATION METHOD AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," March, 2010

SUMMARY OF INVENTION

Technical Problem

In Rel. 15 NR, reporting UE capability information related to a resource/port for a reference signal for channel state information (CSI) (e.g., a CSI-RS) to a network from a UE is supported.

For example, the UE reports information related to the number of CSI-RS resources/the number of CSI-RS ports per band and information related to the number of CSI-RS resources/the number of CSI-RS ports per combination of a plurality of bands (band combination (BC)). The network (for example, a base station) controls a configuration of a CSI-RS resource/port on the basis of the information (or parameter) reported from the UE.

However, how a configuration of the number of CSI-RS resources/the number of CSI-RS ports is controlled on the basis of the information (or parameter) reported from the UE has not been fully studied. Unless capability information related to the number of CSI-RS resources/the number of CSI-RS ports reported from the UE is appropriate or unless appropriate CSI-RS transmission is performed on the basis of the capability information reported from the UE, communication quality may deteriorate.

Thus, an objective of the present disclosure is to provide a terminal, a radio communication method, and a base station that can appropriately perform communication using information related to a channel state information reference signal reported from a terminal.

Solution to Problem

A terminal according to one aspect of the present disclosure includes a control section that controls reporting of a plurality of pieces of first information related to a combination of a channel state information resource for a band combination and the number of ports for the band combination and second information related to the number of ports per channel state information resource for the band combination, and a transmitting section that transmits the first information and the second information.

Advantageous Effects of Invention

According to one aspect of the present disclosure, it is possible to appropriately perform communication using information related to a channel state information reference signal reported from a terminal.

BRIEF DESCRIPTION OF DRAWINGS

FIG. 1 is a diagram to show an example of existing parameters related to a CSI-RS reported by a UE;

FIG. 2 is a diagram to show another example of the existing parameters related to the CSI-RS reported by the UE;

FIG. 4 is a diagram to show an example of configurations of a CSI-RS resource/port for band A/band B;

FIGS. 6A and 6B are diagrams to show an example of parameters related to a CSI-RS reported by a UE;

FIGS. 7A and 7B are diagrams to show another example of the parameters related to the CSI-RS reported by the UE;

FIG. 10 is a diagram to show another example of the number of CSI-RS resources/the number of CSI-RS ports and parameters reported by the UE according to the first aspect;

FIG. 14 is a diagram to show another example of the number of CSI-RS resources/the number of CSI-RS ports reported by the UE according to the first aspect;

FIG. 15 is a diagram to show another example of the number of CSI-RS resources/the number of CSI-RS ports reported by the UE according to the first aspect;

FIG. 21 is a diagram to show an example of reporting of the number of ports for each CSI resource/the number of CSI-RS resources/the number of CSI-RS ports for a BC according to a sixth aspect;

Figure 3:
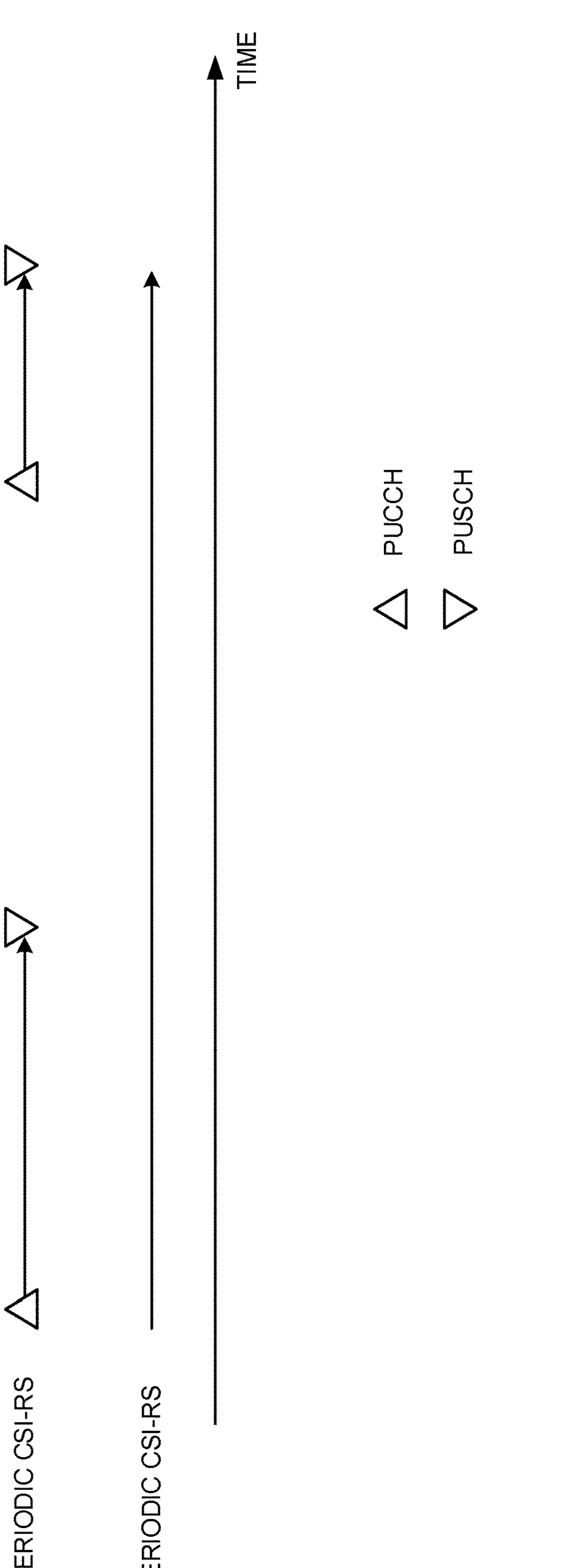
FIG. 3 is a diagram to show an example of an active period of a CSI-RS.

DESCRIPTION OF EMBODIMENTS (CSI Report (CSI Report or Reporting))

In Rel. 15 NR, a terminal (also referred to as a user terminal, User Equipment (UE), and so on) generates (also referred to as determine, calculate, estimate, measure, and so on) channel state information (CSI) on the basis of a reference signal (RS) (or resource for the RS) to transmit (also referred to as report, feed back, and so on) the generated CSI to a network (e.g., a base station). For example, the CSI may be transmitted to the base station with use of an uplink control channel (e.g., a Physical Uplink Control Channel (PUCCH)) or an uplink shared channel (e.g., a Physical Uplink Shared Channel (PUCCH)).

The RS used for generation of the CSI may be, for example, at least one of a channel state information reference signal (CSI-RS), a synchronization signal/broadcast channel (Synchronization Signal/Physical Broadcast Channel (SS/PBCH)) block, a synchronization signal (SS), a demodulation reference signal (DMRS), and the like.

The CSI-RS may include at least one of a non-zero power (Non Zero Power (NZP)) CSI-RS and CSI-Interference Management (CSI-IM). The SS/PBCH block is a block including an SS and PBCH (and corresponding DMRS), and may be referred to as an SS block (SSB) and so on. The SS may include at least one of a primary synchronization signal (PSS) and a secondary synchronization signal (SSS).

The CSI may include at least one parameter (CSI parameter) such as a channel quality indicator (CQI), a precoding matrix indicator (PMI), a CSI-RS resource indicator (CRI), an SS/PBCH block resource indicator (SSBRI), a layer indicator (LI), a rank indicator (RI), L1-RSRP (reference signal received power in Layer 1 (Layer 1 Reference Signal Received Power)), L1-RSRQ (Reference Signal Received Quality), an L1-SINR (Signal-to-Noise and Interference Ratio or Signal to Interference plus Noise Ratio), an L1-SNR (Signal to Noise Ratio), and the like.

The UE may receive information related to a CSI report (report configuration information) to control the CSI report on the basis of the report configuration information. The report configuration information may be, for example, a radio resource control (RRC) information element (IE) "CSI-ReportConfig." Note that in the present disclosure, the RRC IE may be expressed in other words with an RRC parameter, a higher layer parameter, and the like.

The report configuration information (e.g., the RRC IE "CSI-ReportConfig") may include, for example, at least one of the following.

Information related to CSI report type (report type information, for example, RRC IE "reportConfigType")

Information related to one or more quantities of CSI to be reported (one or more CSI parameters) (report quantity information, for example, RRC IE "reportQuantity")

Information related to RS resource used for generation of the quantities (the CSI parameters) (resource information, for example, RRC IE "CSI-ResourceConfigId")

Information related to target frequency domain for CSI report (frequency domain information, for example, RRC IE "reportFreqConfiguration")

For example, the report type information may indicate a periodic CSI (P-CSI) report, an aperiodic CSI (A-CSI) report, or a semi-permanent (semi-persistent) CSI report (Semi-Persistent CSI (SP-CSI)) report.

The report quantity information may specify at least one combination of the above-described CSI parameters (e.g., the CRI, RI, PMI, CQI, LI, L1-RSRP, and the like).

The resource information may be an ID of an RS resource. The RS resource may include, for example, a non-zero power CSI-RS resource or SSB and a CSI-IM resource (e.g., a zero power CSI-RS resource).

The UE perform channel estimation by using a received RS to estimate a channel matrix H. The UE feeds back an index (PMI) determined on the basis of the estimated channel matrix.

The PMI may indicate a precoder matrix (also simply referred to as a precoder) considered by the UE to be appropriate for use in downlink (DL) transmission to the UE. Each value of the PMI may correspond to one precoder matrix. A set of PMI values may correspond to a set of different precoder matrixes referred to as a precoder codebook (also simply referred to as a codebook).

The CSI report may include CSI of one or more types in a space domain. For example, the CSI may include at least one of a first type (type 1 CSI) used for selection of a single beam and a second type (type 2 CSI) used for selection of multiple beams. The single beam may be expressed in other words with a single layer, and the multiple beams may be rephrased as a plurality of beams. The type 1 CSI may not assume multi-user multiple input multiple output (MIMO), and the type 2 CSI may assume the multi-user MIMO.

The above-described codebook may include a codebook for the type 1 CSI (also referred to as a type 1 codebook and so on) and a codebook for the type 2 CSI (also referred to as a type 2 codebook and so on). The type 1 CSI may include type 1 single panel CSI and type 1 multi-panel CSI, and different codebooks (type 1 single panel codebook and type 1 multi-panel codebook) may be defined.

In the present disclosure, type 1 and type I may be interchangeably interpreted. In the present disclosure, type 2 and type II may be interchangeably interpreted.

An uplink control information (UCI) type may include at least one of Hybrid Automatic Repeat reQuest ACKnowledgement (HARQ-ACK), a scheduling request (SR), and CSI. The UCI may be delivered by a PUCCH, or may be delivered by a PUSCH.

The UE may report a list of supported CSI-RS resources for each CSI codebook type. For example, the UE reports information related to a maximum number of transmission ports per resource, a maximum number of resources per band, and a total number of transmission ports per band (e.g., {maxNumberTxPortsPerResource, maxNumberResourcesPerBand, totalNumberTxPortsPerBand}).

The maximum number of transmission ports per resource (maxNumberTxPortsPerResource) indicates a maximum number of transmission ports in the resource (e.g., a maximum number of transmission ports capable of being simultaneously configured in the CSI-RS resource). The maximum number of resources per band (maxNumberResourcesPerBand) indicates a maximum number of resources in all CCs (or cells) in the band (e.g., a maximum number of CSI-RS resources capable of being simultaneously configured across all CCs). The total number of transmission ports per band (totalNumberTxPortsPerBand) indicates a total number of transmission ports in all CCs in the band (e.g., a total number of transmission ports capable of being simultaneously configured across all CCs). Note that the CCs correspond to CCs included in the band.

The UE may report codebook parameters related to a codebook (e.g., codebookParameters) as band parameters per band (e.g., BandNR parameters). The codebook parameters may indicate parameters corresponding to a codebook supported by the UE. The codebook parameter may include at least one of the following parameters (1) to (4). For example, (1) may be mandatory, and (2) to (4) may be optional.

(1) Parameter for type 1 single panel coatbook (type1 singlePanel) supported by UE
(2) Parameter for type 1 multi-panel codebook (type1 multiPanel) supported by UE
(3) Parameter for type 2 codebook (type2) supported by UE
(4) Parameter for type 2 codebook (type2-PortSelection) including port selection supported by UE Each parameter of (1) to (4) may include information (supportedCSI-RS-ResourceList) related to a list of CSI-RS resources supported by the UE. The information related to the list of the CSI-RS resources may include a list of the following parameters mentioned above.

Maximum number of transmission ports per resource (maxNumberTxPortsPerResource)
Maximum number of resources per band (maxNumberResourcesPerBand)
Total number of transmission ports per band (totalNumberTxPortsPerBand)

The parameters (1) to (4) related to the above-described codebooks reported by the UE may be referred to as FG2-36/2-40/2-41/2-43. The parameters {maxNumberTxPortsPerResource, maxNumberResourcesPerBand, totalNumberTxPortsPerBand} included in the list of the CSI-RS resources may be referred to as triplets (e.g., Triplets).

The UE to support a combination of a plurality of bands may report a certain parameter (e.g., UE capability information) for each combination of bands. The combination of bands may be referred to as a band combination (BC).

The certain parameter (e.g., CA-ParametersNR or csi-RS-IM-ReceptionForFeedbackPerBandComb) may include a parameter (e.g., maxNumberSimultaneousNZP-CSI-RS-ActBWP-AllCC) corresponding to a maximum number of CSI-RS resources in all CCs/active BWP and a parameter (e.g., totalNumberPortsSimultaneousNZP-CSI-RS-ActBWP-AllCC) corresponding to a total number of ports for CSI-RS resources in all CCs/active BWP.

The parameter (e.g., maxNumberSimultaneousNZP-CSI-RS-ActBWP-AllCC) corresponding to a maximum number of CSI-RS resources in all CCs/active BWP indicates a maximum number of CSI-RS resources simultaneously configured across all CCs in an active BWP. This parameter limits a total number of CSI-RS resources capable of being configured by a NW across all CCs. The NW may apply this limit in addition to a limit notified by a maximum number of CSI-RS resources per CC (e.g., maxNumberSimultaneousNZP-CSI-RS-PerCC).

The parameter (e.g., totalNumberPortsSimultaneousNZP-CSI-RS-ActBWP-AllCC) corresponding to a total number of ports for CSI-RS resources in all CCs/active BWP indicates a total number of ports for CSI-RS resources simultaneously configured across all CCs in an active BWP. This parameter limits a total number of ports capable of being configured by the NW across all CCs. The NW may apply this limit in addition to a limit notified by a total number of ports for CSI-RS resources per CC (e.g., totalNumberPortsSimultaneousNZP-CSI-RS-PerCC).

The certain parameter (or certain parameter reported per BC) related to the band combination (BC) reported by the UE may be referred to as FG2-33.

The UE may report the certain parameter (e.g., CA-ParametersNR) per BC (see FIG. 1), and may report the parameters (e.g., codebookParameters) (see FIG. 2)/triplets related to the codebook per band.

In CSI processing criteria, the UE may not assume that any slot has the number of active CSI-RS ports or the number of active CSI-RS resources equal to or greater than that reported as the capability information. In a case of an aperiodic CSI-RS, CSI-RS (e.g., NZP CSI-RS) resources are active in a period from reception of a PDCCH including a CSI request (e.g., a final symbol) until transmission of a PUSCH to perform the CSI report (e.g., a final symbol) (see FIG. 3). In a case of a periodic CSI-RS, CSI-RS (e.g., NZP CSI-RS) resources are active in a period from a time at which the periodic CSI-RS is configured by higher layer signaling to a time at which the CSI-RS is released.

The UE reports a first parameter (e.g., FG2-36/2-40/2-41/2-43)/triplet related to one or more codebooks per band. For example, assume a case where the UE reports the following lists as the first parameter/triplet ({maxNumberTxPortsPerResource, maxNumberResourcesPerBand, totalNumberTxPortsPerBand}) for band A and band B.

Band A: {16, 1, 16}, {8, 2, 12}
Band B: {16, 1, 16}, {8, 2, 12}

In this case, when the UE uses a combination of band A and band B, it is required that {16, 2, 32} and {8, 4, 24} are supported.

However, a case where only a common hardware including a specific budget (certain budget) is used for CSI calculation for all bands in 1 UE is also conceivable. In such a case, it is conceivable that a capability of the UE to actually support a combination of bands is lower than that described above (e.g., {16, 1, 16}, {8, 2, 12}).

Typically, the parameters related to the codebook are reported per band, and thus a CSI processing capability is not shared between bands supported by the UE. Thus, if the UE reports the parameters related to the codebook (e.g., maxNumberResourcesPerBand and totalNumberTxPortsPerBand) per band without considering a combination of bands, there is a possibility that CSI-RS resources/ports equal to or greater than those of a UE capability are configured when the bands are combined with each other.

As a method for avoiding such a case, it is conceivable that the UE reports (under-reports) a value lower than that of an actual UE capability as a value reported per band. In other words, it is assumed that the UE conservatively determines (underestimates) values of the first parameter/triplet related to the codebook reported for each band by assuming a case where multiple bands are combined.

For example, it is conceivable that the UE under-reports the first parameter (e.g., FG2-36/2-40/2-41/2-43)/triplet related to the codebooks for band A and band B, as described below.

Band A: {4, 1, 4}

Band B: {4, 1, 4}

When the UE under-reports, a reduced number of CSI-RS resources/number of CSI-RS ports scheduled from the network are configured also when one band is used (a single band mode is applied). Thus, when the UE applies the single band mode, CSI-RS resources/ports less than those of the UE capability are configured, and thus communication quality may deteriorate.

Therefore, it is conceivable that the UE reports a certain parameter related to the CSI processing capability in consideration of a band combination. For example, the UE reports the parameter (e.g., maxNumberSimultaneousNZP-CSI-RS-ActBWP-AllCC) corresponding to a maximum number of CSI-RS resources in all CCs/active BWP and the parameter (e.g., totalNumberPortsSimultaneousNZP-CSI-RS-ActBWP-AllCC) corresponding to a total number of ports for CSI-RS resources in all CCs/active BWP for each combination of bands (BC), as mentioned above.

For example, consider the certain parameter (e.g., FG2-33) related to the BC in a case where the first parameter (e.g., FG2-36/2-40/2-41/2-43)/triplet related to the codebooks are reported for band A and band B, as described below.

Band A: {16, 1, 16}, {8, 2, 12}

Band B: {16, 1, 16}, {8, 2, 12}

<Case 1>

Assume a case where the UE reports {2, 16} as a certain parameter (second parameter) {maxNumberSimultaneous-NZP-CSI-RS-ActBWP-AllCC, totalNumberPortsSimultaneousNZP-CSI-RS-ActBWP-AllCC} related to a band combination (e.g., band A+B).

In such a case, the NW can configure 1 CSI-RS resource (or one 8-port CSI-RS resource) corresponding to 8 ports for band A and 1 CSI-RS resource corresponding to 8 ports for band B. However, the NW fails to configure two CSI-RS resources (or two CSI reports including 8-port CSI-RS resources) each corresponding to 8 ports per band.

This is because a maximum number of CSI-RS resources is limited to two in the BC. When two CSI-RS resources are configured for only either band, a total number of the number of ports is limited to 12, and thus the NW fails to configure two 8-port CSI-RSs for one band.

8 ports (band A)+8 ports (band B) are configurable for a report per band only in a case where the report is interpreted as that per band. However, this case requires the UE to process a 16-port CSI-RS with 2 bands. The UE that shares a CSI processing unit between the bands includes the same CSI processing capability for both intra-band and inter-band processing, and thus can process only up to 12 ports for a total of two CSI-RSs even in multiple bands if {x, 2, 12} is reported per band. Thus, the UE will perform under-reporting, such as {x, 2, 6}, per band in order to prevent the 16 port-CSI-RS from being configure with 2 bands, as described above.

<Case 2>

Assume a case where the UE reports {1, 16} as the certain parameter related to the band combination (e.g., band A+B).

In such a case, the number of CSI-RS resources simultaneously configured in band A and band B is limited to one. Thus, if a periodic CSI-RS is configured in any band, the CSI report is not supported in another band. For supporting the CSI report in both bands, it is necessary that aperiodic CSI-RSs non-overlapping with each other in a time direction are each configured in both bands. Note, however, that also in this case, it is necessary to control so as not to simultaneously activate the aperiodic CSI-RSs in the two bands.

<Case 3>

Assume a case where the UE reports {2, 12} as the certain parameter related to the band combination (e.g., band A+B).

In such a case, it is possible that 1 CSI-RS resource is configured in each band, 4 ports are configured for one band, and 8 ports are configured for the other band (configurations 1 and 2 of FIG. 4). It is possible that 1 CSI-RS resource corresponding to 12 ports is configured in each band by shifting the aperiodic CSI-RSs in the time direction (TDM) between band A and band B (configuration 3 of FIG. 4).

In case 3, a total number of the number of ports in the BC is limited to 12. Thus, in one band (band A/B), 1 CSI-RS resource and 16 ports (CSI-RS resource with 16 ports) are not supported in an inter-band CA even when only a plurality of CCs in a single band are active.

As described above, existing reporting methods report one certain parameter related to a band combination (report, for example, a certain parameter common to different CSI types). However, such reporting methods may fail to appropriately configure the number of CSI-RS resources/the number of CSI-RS ports configured per band.

Thus, the inventors of the present invention studied a reporting method/interpretation of the parameter related to the BC, and came up with the idea of the present embodiments.

Hereinafter, embodiments according to the present disclosure will be described in detail with reference to the drawings. The radio communication methods and respective aspects according to respective embodiments may each be employed individually, or may be employed in combination. Note that in the present disclosure, "A/B" may be interpreted as "at least one of A and B."

In descriptions below, a port, a CSI-RS port, and a CSI-RS resource port may be interchangeably interpreted. "Per band combination (BC)" may be "per CSI codebook type" in addition to "per BC."

(First Aspect)

In a first aspect, a case where a plurality of parameters (or a combination of parameters) are reported as certain parameters (e.g., FG2-33) related to a band combination will be described.

Descriptions below show a case where a maximum number of CSI-RS resources in all CCs/active BWP (e.g., maxNumberSimultaneousNZP-CSI-RS-ActBWP-AllCC) and a total number of ports for CSI-RS resources in all CCs/active BWP (e.g., totalNumberPortsSimultaneousNZP-CSI-RS-ActBWP-AllCC) are reported as the certain parameters related to the band combination (BC), but the present disclosure is not limited to this. Additionally, a maximum number of transmission ports per resource may be reported.

As the certain parameters (e.g., FG2-33) related to the BC, a report/list of a plurality of combinations is supported (or allowed). The number of certain parameters reported by a UE may be determined on the basis of a certain condition (e.g., the number of CSI codebook types (or CSI types)). CSI-RS resources/CSI-RS ports may be reported/configured per BC and per CSI codebook type.

The UE may control delivery of UE capability information reported per BC by using at least one of reporting method 1-1 to reporting method 1-3 below.

<Reporting Method 1-1>

Figures 5A, 5B:
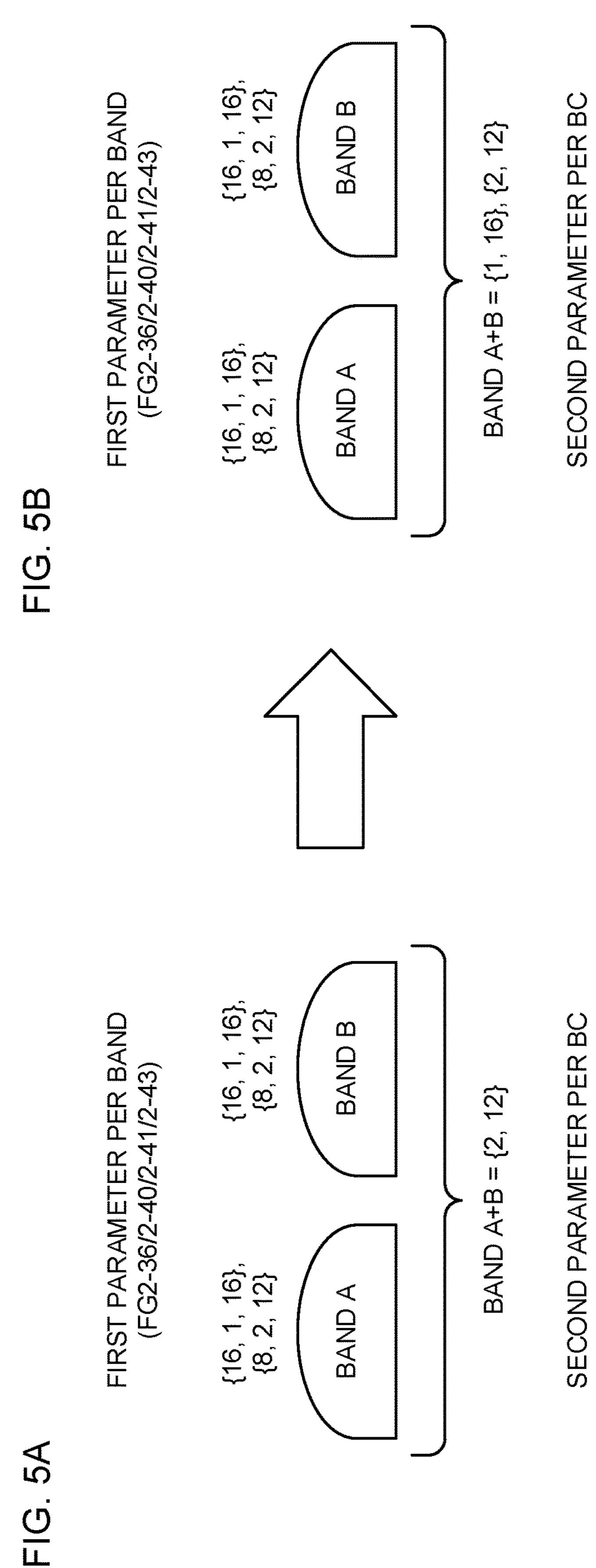
FIGS. 5A and 5B are diagrams to show an example of reporting of the number of CSI-RS resources/the number of CSI-RS ports according to a first aspect.

For example, the UE may report one or more combinations of {maxNumberSimultaneousNZP-CSI-RS-ActBWP-AllCC, totalNumberPortsSimultaneousNZP-CSI-RS-ActBWP-AllCC} per BC and per CSI codebook type (see FIGS. 5A and 5B). FIG. 5A shows a reporting method of existing systems for reporting one certain parameter, and FIG. 5B shows a reporting method for reporting a plurality of certain parameters (also referred to as updated FG2-33 or enhanced FG2-33).

In FIG. 5B, the UE reports parameters (e.g., FG2-36/2-40/2-41/2-43)/triplets related to a codebook for band A and band B, as described below.

Band A: {16, 1, 16}, {8, 2, 12}

Band B: {16, 1, 16}, {8, 2, 12}

Furthermore, FIG. 5B shows a case where two certain parameters (e.g., updated FG2-33)/lists related to the BC are reported, as described below. Of course, the reported combinations are not limited to two, and may be three or more.

Band A+B: {1, 16}, {2, 12}

The UE may report one or more combinations of {maxNumberSimultaneousNZP-CSI-RS-ActBWP-AllCC, totalNumberPortsSimultaneousNZP-CSI-RS-ActBWP-AllCC} per BC and for each CSI codebook type (see FIG. 6A). FIG. 6A shows a case where a parameter related to the maximum number of the CSI-RS resources (e.g., maxNumberSimultaneousNZP-CSI-RS-ActBWP-AllCC) and a parameter related to the total number of the ports (e.g., totalNumberPortsSimultaneousNZP-CSI-RS-ActBWP-AllCC) are each reported per BC (and for each CSI codebook type). Each list may be defined so that each list is selected from specific numbers (see FIG. 6B).

<Reporting Method 1-2>

Alternatively, parameters (e.g., csi-RS-IM-ReceptionForFeedbackPerBandComb) including the certain parameters (e.g., updated FG2-33) may be reported per BC and per CSI codebook type (see FIG. 7A).

<Reporting Method 1-3>

Alternatively, a list of parameters (e.g., CA-ParametersNR-v1540) including the parameters (e.g., csi-RS-IM-ReceptionForFeedbackPerBandComb) including the certain parameters (e.g., updated FG2-33) may be reported per BC and per CSI codebook type (see FIG. 7B).

<Report Contents>

The combinations of the certain parameters (e.g., FG2-33) related to the BC may be limited. In other words, only a limited combination may be reported as the certain parameters (e.g., updated FG2-33) related to the BC.

The limit for the certain parameters may be determined on the basis of the parameters (e.g., FG2-36/2-40/2-41/2-43)/triplets related to the codebook. For example, when maximum values of the CSI-RS resources are 1, 2 and 1, 2 in band A and band B, respectively, the UE may assume that at least one or all of the following maximum values #1 to #5 are supported for a maximum value of possible CSI-RS resources in whole band A+B.

Maximum value #1: maximum value of one of band A or band B

Maximum value #2: maximum value of the other of band A or band B

Maximum value #3: addition of band A and band B (1+1)

Maximum value #4: addition of band A and band B (2+1 or 1+2)

Maximum value #5: addition of band A and band B (2+2)

Figure 8:
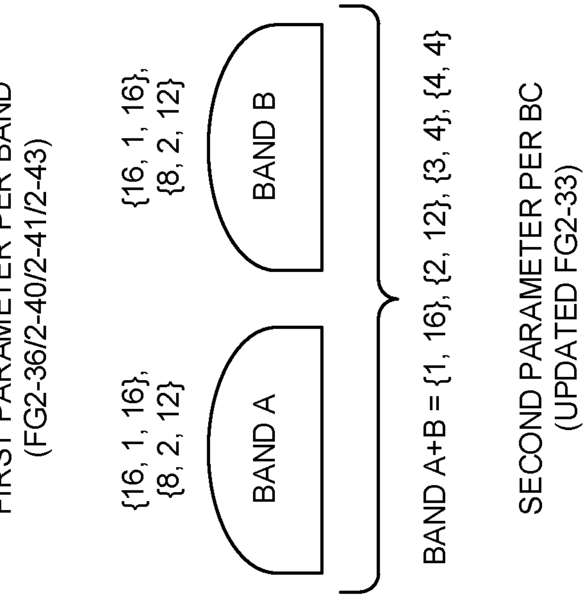
FIG. 8 is a diagram to show another example of the reporting of the number of CSI-RS resources/the number of CSI-RS ports according to the first aspect.

The UE may support configurations for 1, 2, 3, and 4 as the maximum value of possible CSI-RS resources in whole band A+B. For example, the UE may report at least one or all of {1, 16}, {2, 12}, {3, 4}, and {4, 4} as the certain parameters related to the BC (see FIG. 8). In this case, the maximum values of the CSI-RS resources 3, 4 may be limited to a case where the band combination is applied (and maximum CSI-RS resources in 1 CC are up to 2).

Note that the number of the ports may also be determined on the basis of the parameters (e.g., FG2-36/2-40/2-41/2-43)/triplets related to the codebook similarly to the number of the CSI-RS resources.

Thus, the plurality of the parameters/lists are reported as the certain parameters related to the BC. Therefore, a plurality of CSI-RS resources/ports can be configured for the BC, and thus it is possible to appropriately configure the number of the CSI-RS resources/ports without under-reporting the parameters (e.g., FG2-36/2-40/2-41/2-43)/triplets related to the codebook.

Even when one number of CSI-RS resources is reported as the certain parameters related to the BC, a plurality of the numbers of CSI-RS resources are separately reported, and thus it is possible to configure the CSI-RS resources for a plurality of bands when the BC is applied.

The UE may explicitly notify, as the certain parameters related to the BC, at least one of information related to a maximum number of resources (e.g., maxNumberSimultaneousNZP-CSI-RS-ActBWP-AllCC) and information related to a total number of ports corresponding to a CSI-RS (e.g., totalNumberPortsSimultaneousNZP-CSI-RS-ActBWP-AllCC).

<Report of Total Number of Ports>

Figure 9:
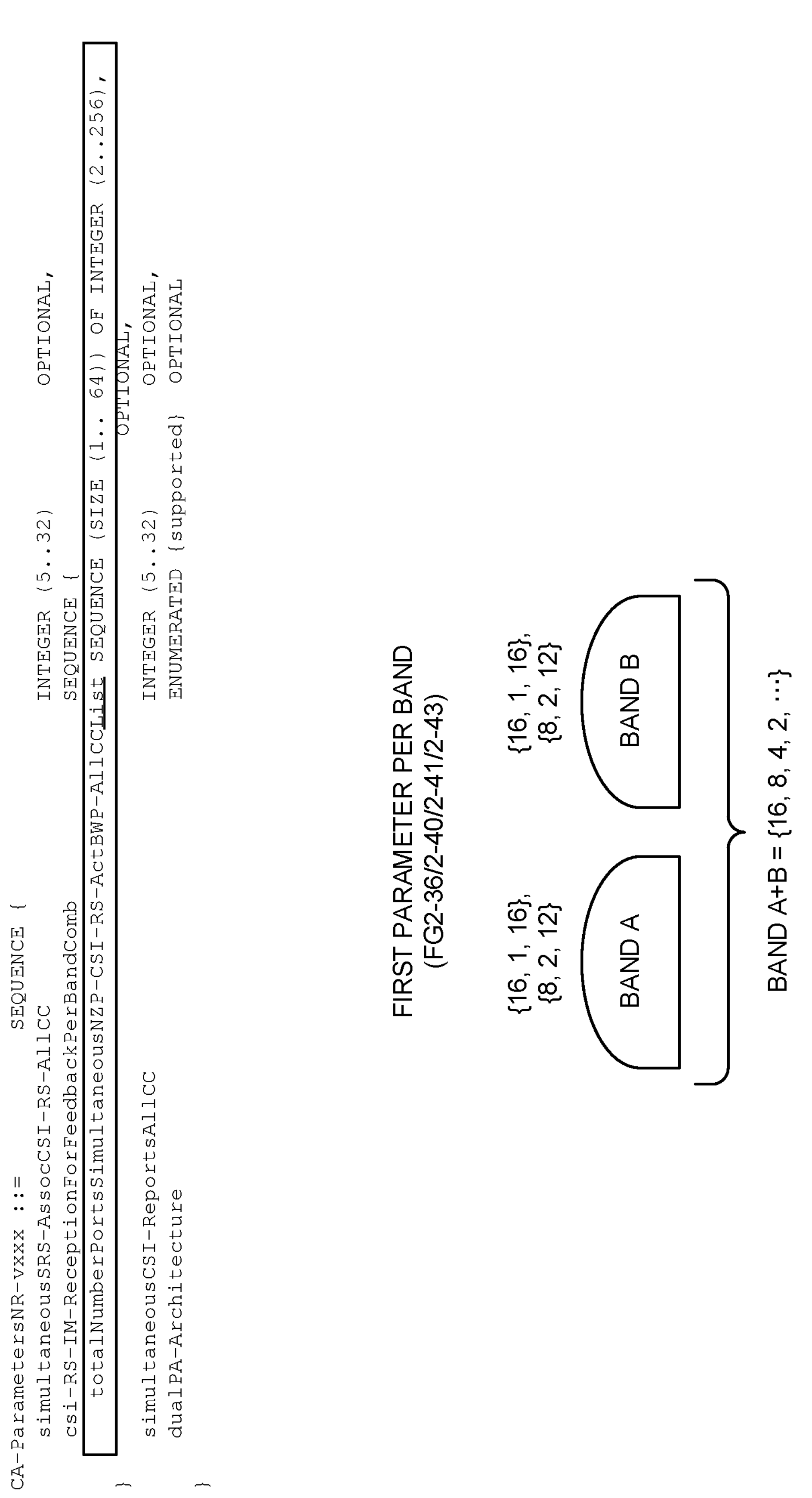
FIG. 9 is a diagram to show an example of the number of CSI-RS resources/the number of CSI-RS ports and parameters reported by a UE according to the first aspect.

The UE may control so as to explicitly report a list of total numbers of ports corresponding to the CSI-RS and so as not to explicitly report information related to maximum numbers of the CSI-RS resources (see FIG. 9). In this case, an index of the list may correspond to the number of the CSI-RS resources (e.g., 1 to 64).

For example, the first value of the list may correspond to a total number of CSI-RS ports for 1 CSI-RS resource. In other words, the reported total numbers of the ports {16, 8, 4, 2, . . . } may correspond to the maximum numbers of the CSI-RS resources {1, 2, 3, 4, . . . }, respectively. The ports may be selected from 2 to 256 ports.

In FIG. 9, 16 CSI-RS ports correspond to 1 CSI-RS resource, and 8 CSI-RS ports correspond to 2 CSI-RS resources. Thus, the maximum numbers of the CSI-RS resources are not explicitly reported, and thus it is possible to suppress an increase in overhead in a case where the UE performs the report.

A certain number of total numbers of the ports may also be reported (see FIG. 10). For example, the UE reports total numbers of ports for $N_1$ (here, 7 (1, 2, 4, 8, 16, 32, 64)) of maximum numbers of CSI-RS resources. An index of the list may correspond to $N_1$ of the maximum numbers of CSI-RS resources (1, 2, 4, 8, 16, 32, 64).

For example, the first value of the list may correspond to a total number of CSI-RS ports for 1 CSI-RS resource. In other words, the reported total numbers of the ports {16, 8, 4, 2, . . . } may correspond to the maximum numbers of the CSI-RS resources {1, 2, 4, 8, . . . }, respectively. The CSI-RS ports may be selected from 2 to 256 ports.

$N_1$ may be defined by specifications beforehand, or may be configured for the UE by higher layer signaling or the like from the network.

Alternatively, reported $N_1$ and maximum values of the CSI-RS resources corresponding to $N_1$ may be determined on the basis of the parameters (e.g., FG2-36/2-40/2-41/2-43)/triplets related to the codebook reported per band.

Figure 11:
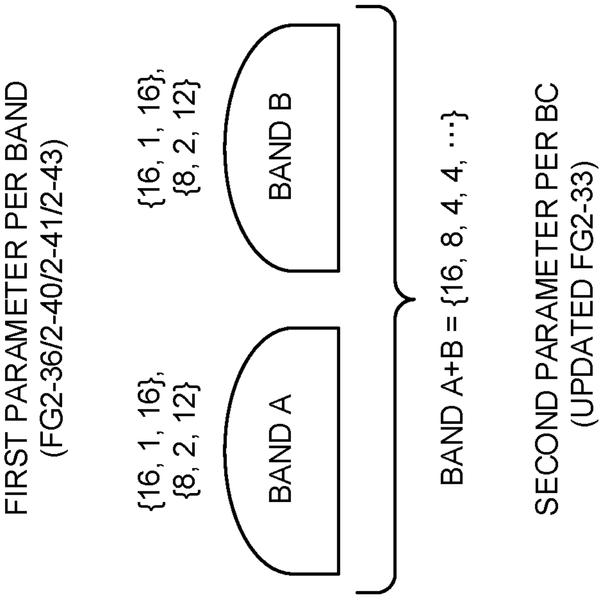
FIG. 11 is a diagram to show another example of the number of CSI-RS resources/the number of CSI-RS ports reported by the UE according to the first aspect.

For example, the UE assumes a case where maximum numbers of the CSI-RS resources are 1, 2 and 1, 2 in band A and band B, respectively (see FIG. 11). In such a case, total numbers of ports corresponding to the numbers of CSI-RS resources {1, 2, 3, 4} supported by the following maximum values #1 to #5 may be reported for a maximum value of possible CSI-RS resources in whole band A+B. In other words, it may be judged that $N_1$=4 (1, 2, 3, 4)

Maximum value #1: maximum value of one of band A or band B

Maximum value #2: maximum value of the other of band A or band B

Maximum value #3: addition of band A and band B (1+1)

Maximum value #4: addition of band A and band B (2+1 or 1+2)

Maximum value #5: addition of band A and band B (2+2)

In this case, an index of the list may correspond to $N_1$ of maximum numbers of the CSI-RS resources (1, 2, 3, 4). The reported total numbers of the ports {16, 8, 4, 4} may correspond to the maximum numbers of the CSI-RS resources {1, 2, 3, 4}, respectively.

<Report of Maximum Numbers of CSI-RS Resources>

Figure 12:
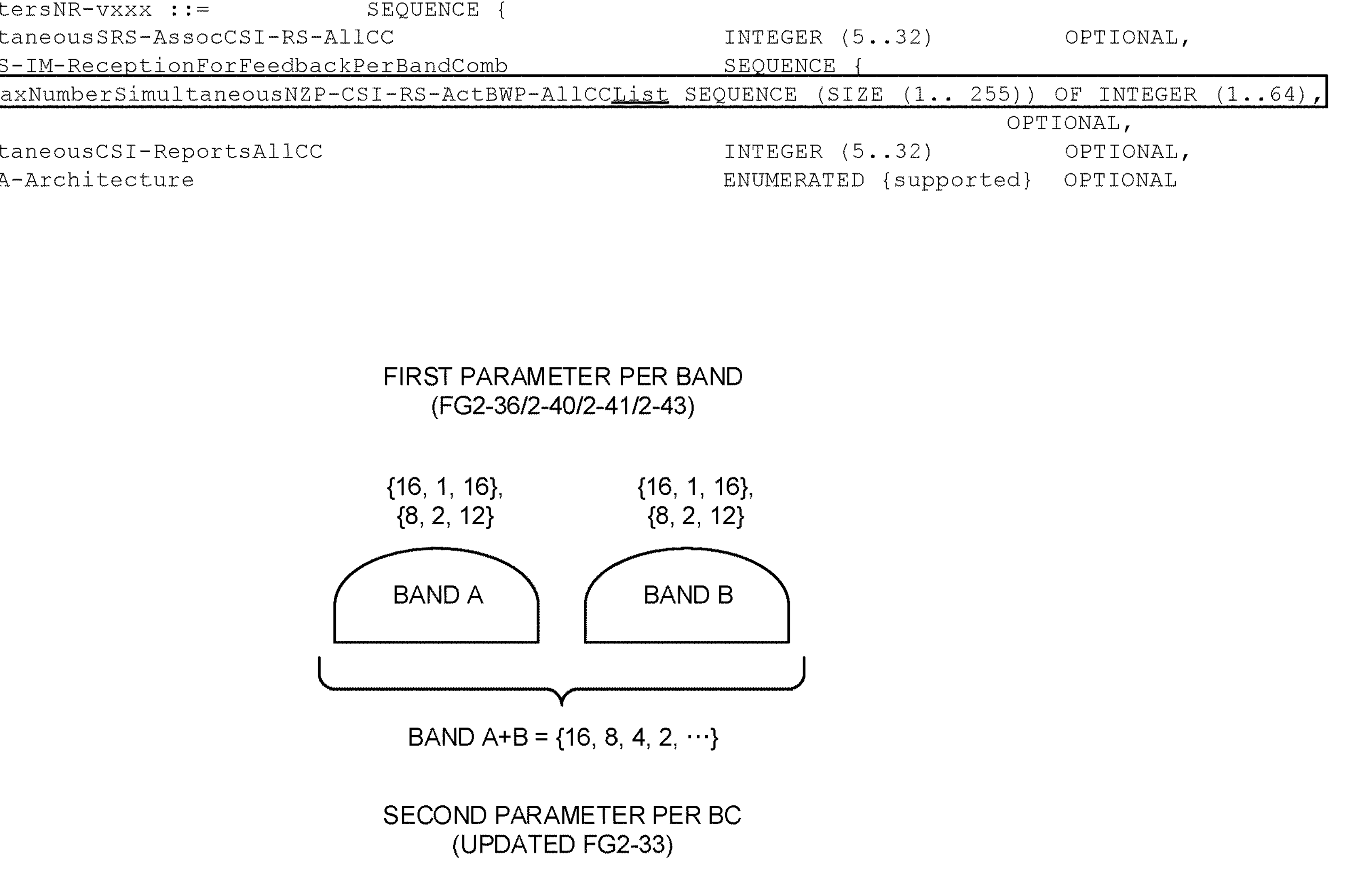
FIG. 12 is a diagram to show another example of the number of CSI-RS resources/the number of CSI-RS ports and parameters reported by the UE according to the first aspect.

The UE may control so as to explicitly report a list of the maximum numbers of the CSI-RS resources and so as not to explicitly report information related to total numbers of ports corresponding to the CSI-RS (see FIG. 12). In this case, an index of the list may correspond to the number of ports corresponding to the CSI-RS resources (e.g., 2 to 256).

For example, the first value of the list may indicate maximum numbers of CSI-RS resources for two ports. In other words, the reported maximum numbers of the CSI-RS resources {16, 8, 4, 2, . . . } may correspond to the total numbers of the ports {2, 3, 4, 5, . . . }, respectively. The CSI-RS resources may be selected from 1 to 64 resources.

In FIG. 12, 16 CSI-RS resources correspond to 2 ports, and 8 CSI-RS resources correspond to 3 ports. Thus, the total numbers of ports corresponding to the CSI-RS resources are not explicitly reported, and thus it is possible to suppress an increase in overhead in a case where the UE performs the report.

Figure 13:
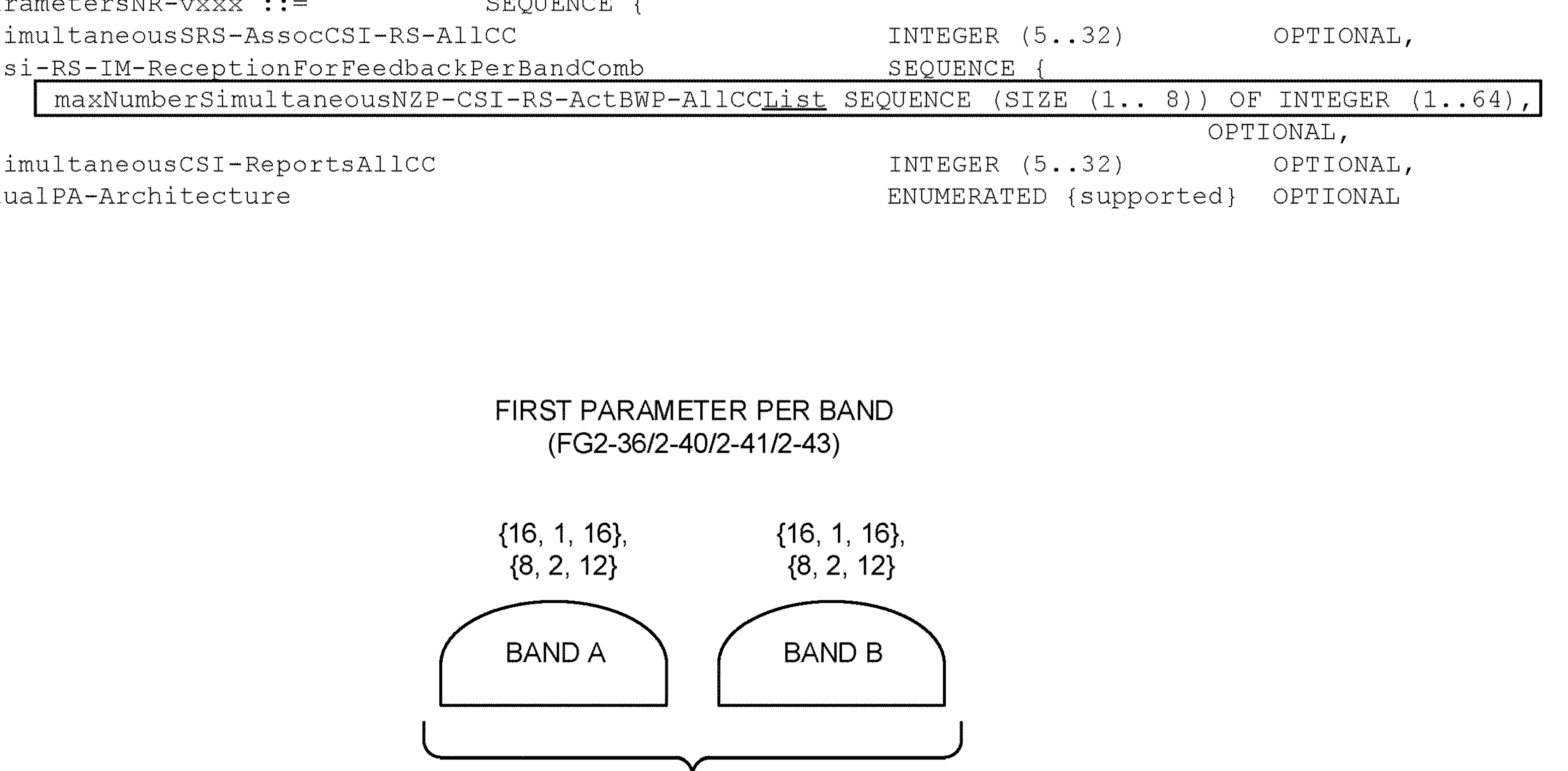
FIG. 13 is a diagram to show another example of the number of CSI-RS resources/the number of CSI-RS ports and parameters reported by the UE according to the first aspect.

A certain number of maximum numbers of the CSI-RS resources may also be reported (see FIG. 13). For example, the UE reports maximum numbers of CSI-RS resources for $N_2$ (here, 8 (2, 4, 8, 16, 32, 64, 128, 256)) of total numbers of ports. An index of the list may correspond to $N_2$ of the total numbers of ports (2, 4, 8, 16, 32, 64, 128, 256).

For example, the first value of the list may correspond to maximum numbers of CSI-RS resources for two ports. In other words, the reported maximum numbers of the CSI-RS resources {16, 8, 4, 2, . . . } may correspond to the total numbers of the ports {2, 4, 8, 16, . . . }, respectively. The CSI-RS resources may be selected from 1 to 64 resources.

$N_2$ may be defined by specifications beforehand, or may be configured for the UE by higher layer signaling or the like from the network.

A maximum number of CSI-RS resources per BC included in the certain parameters (e.g., FG2-33) related to the BC may be configured so that the maximum number of the CSI-RS resources is the following values/ranges.

<Range #1>

The maximum number of the CSI-RS resources may be the same value as a maximum number of CSI-RS resources per band (or included in the triplets) (maxNrofCSI-RS-ResourcesperBC=maxNrofCSI-RS-Resources).

<Range #2>

The maximum number of the CSI-RS resources may be a value smaller than the maximum number of CSI-RS resources per band (or included in the triplets) (maxNrofCSI-RS-ResourcesperBC<maxNrofCSI-RS-Resources).

<Range #3>

The maximum number of the CSI-RS resources may be a value larger than the maximum number of CSI-RS resources per band (or included in the triplets) (maxNrofCSI-RS-ResourcesperBC>maxNrofCSI-RS-Resources).

The values/ranges for the maximum number of the CSI-RS resources per BC may be defined by specifications beforehand, or may be configured for the UE by higher layer signaling or the like from the network.

<Configuration/Interpretation of Certain Parameter Related to BC>

When a plurality of combinations are reported as the certain parameters (e.g., FG2-33) related to the BC reported from the UE, maximum values of CSI-RS resources each included in each combination may be controlled so that the maximum values are different from each other.

For example, assume a case where three combinations {1, 16}, {2, 12}, and {3, 8} are reported as the certain parameters {maxNumberSimultaneousNZP-CSI-RS-ActBWP-AllCC, totalNumberPortsSimultaneousNZP-CSI-RS-ActBWP-AllCC} from the UE (see FIG. 14). Here, maximum numbers of CSI-RS resources of the certain parameters included in each combination/list are 1, 2, and 3, and are different from each other.

In this case, when one active CSI-RS resource is configured in the BC in a slot, a total of 16 ports are supported in the BC. When two active CSI-RS resources are configured in the BC in the slot, a total of 12 ports are supported in the BC. When three active CSI-RS resources are configured in the BC in the slot, a total of 8 ports are supported in the BC.

The certain parameters (e.g., FG2-33) related to the BC are used for reporting for multiple bands, and thus reporting of one CSI-RS resource may not be performed as the certain parameters reported per BC (see FIG. 15). In other words, the certain parameters may be limited to reporting related to the number of CSI-RS resources having a value larger than 1.

Even when there is no explicit indication/limit by higher layer signaling or the like, the UE may assume that reporting a total of one CSI-RS resource per BC is not allowed.

Alternatively, even when there is no explicit indication/limit by higher layer signaling or the like, the UE may assume that reporting a total of one CSI-RS resource per BC is not allowed when reporting at most one number of CSI-RS resources in any band.

When a total of one CSI-RS resource is configured (e.g., in a case of a single band), maximum numbers of CSI-RS ports may be limited on the basis of parameters reported per band (e.g., at least one of maxNumberTxPortsPerResource and totalNumberTxPortsPerBand).

(Second Aspect)

In a second aspect, a UE operation in a case where a single band is applied or configured will be described.

When a parameter (e.g., FG2-36/2-40/2-41/2-43)/triplet related to a codebook reported per band and a certain parameter (e.g., FG2-33) related to a BC reported per BC are reported, case 2-1 to case 2-4 below are conceivable.

<Case 2-1>

Figure 16A:
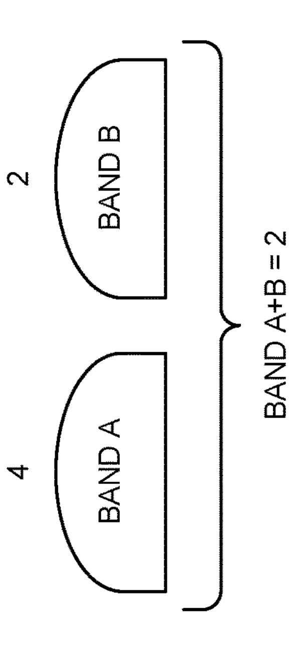
FIGS. 16A to 16D are diagrams to describe multiple cases of the number of CSI-RS resources/the number of CSI-RS ports reported by a UE.

A plurality of CSI-RS resources are allowed per band report of the parameter/triplet related to the codebook, and a plurality of CSI-RSs are allowed per BC with the certain parameter (see FIG. 16A). FIG. 16A shows a case where a maximum number of CSI-RS resources for band A is 4, a maximum number of CSI-RS resources for band B is 2, and a maximum number of CSI-RS resources for a band combination (band A+B) is 2.

In such a case, when the single band is applied, the maximum numbers of the CSI-RS resources are band A=2, band B=2, and band A+B=2 in consideration of both of the parameter/triplet related to the codebook and the certain parameter related to the BC.

<Case 2-2>

Figure 16B:
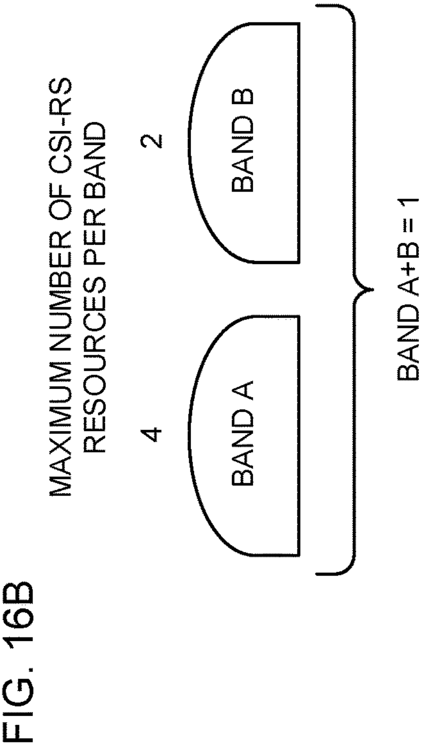

A plurality of CSI-RS resources are allowed per band report of the parameter/triplet related to the codebook, and one CSI-RS is allowed per BC with the certain parameter (see FIG. 16B). FIG. 16B shows a case where a maximum number of CSI-RS resources for band A is 4, a maximum number of CSI-RS resources for band B is 2, and a maximum number of CSI-RS resources for a band combination (band A+B) is 1.

In such a case, when the single band is applied, in consideration of both of the parameter/triplet related to the codebook and the certain parameter related to the BC, the maximum numbers of the CSI-RS resources are band A=1, band B=1, and band A+B=1.

<Case 2-3>

Figure 16C:
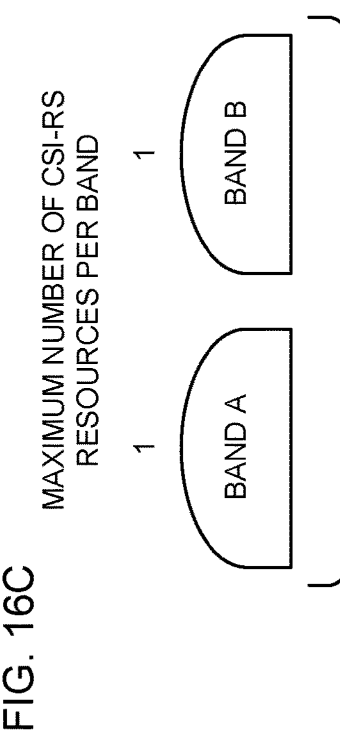

One CSI-RS resource is allowed per band report of the parameter/triplet related to the codebook, and a plurality of CSI-RSs are allowed per BC with the certain parameter (see FIG. 16C). FIG. 16C shows a case where a maximum number of CSI-RS resources for band A is 1, a maximum number of CSI-RS resources for band B is 1, and a maximum number of CSI-RS resources for a band combination (band A+B) is 2.

In such a case, when the single band is applied, the maximum numbers of the CSI-RS resources are band A=1, band B=1, and band A+B=2 in consideration of both of the parameter/triplet related to the codebook and the certain parameter related to the BC.

<Case 2-4>

Figure 16D:
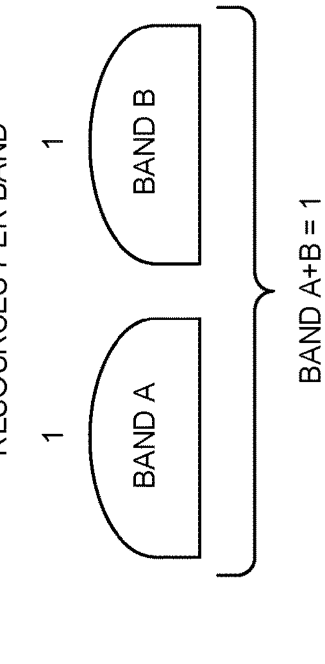

One CSI-RS resource is allowed per band report of the parameter/triplet related to the codebook, and a plurality of CSI-RSs are allowed per BC with the certain parameter (see FIG. 16D). FIG. 16D shows a case where a maximum number of CSI-RS resources for band A is 1, a maximum number of CSI-RS resources for band B is 1, and a maximum number of CSI-RS resources for a band combination (band A+B) is 1.

In such a case, when the single band is applied, in consideration of both of the parameter/triplet related to the codebook and the certain parameter related to the BC, the maximum numbers of the CSI-RS resources are band A=1, band B=1, and band A+B=1.

In the above-described case (e.g., case 2-3), when the single band is applied, in consideration of both of the parameter/triplet related to the codebook and the certain parameter related to the BC, configuration of the number of CSI-RS resources allowed in the single band fails.

Thus, when the single band is applied or configured, the number of CSI-RS resources/the number of CSI-RS ports may be limited by a report of the parameter/triplet related to the codebook per band, and may not be limited by a report of the certain parameter related to the BC.

For example, when the single band is applied or configured, the UE may judge the number of CSI-RS resources/the number of CSI-RS ports on the basis of a value reported with the parameter/triplet related to the codebook. In other words, the UE may, as the UE operation in the single band, ignore a value reported with the certain parameter related to the BC and assume that CSI-RS resources/ports corresponding to the value reported with the parameter/triplet related to the codebook are configured (see FIG. 17).

Figure 17:
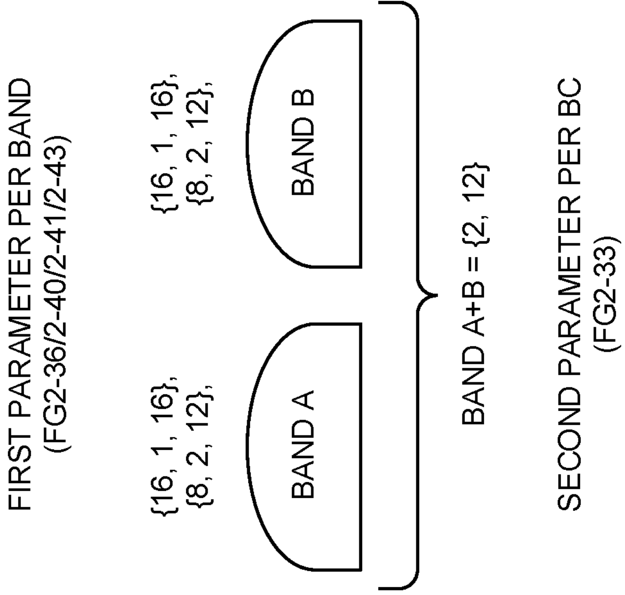
FIG. 17 is a diagram to show an example of the number of CSI-RS resources/the number of CSI-RS ports reported by a UE according to a second aspect.

FIG. 17 shows a case where {16, 1, 16} and {8, 2, 12} are each reported as the parameter (e.g., FG2-36/2-40/2-41/2-43)/triplet related to the codebook corresponding to band A and band B, and {2, 12} is reported as the certain parameter (e.g., FG2-33) related to the BC corresponding to the band combination (band A+B).

When single band A or single band B is applied or configured, the network may configure at most one CSI-RS resource including a total of 16 ports or at most two CSI-RS resources including a total of 12 ports. When the single band is configured, the UE may ignore the certain parameter related to the BC.

When the band combination (band A+B) is applied or configured, the network may configure at most two CSI-RS resources including a total of 12 ports (e.g., 6 ports for band A+6 ports for band B).

Thus, it is possible to appropriately configure CSI-RS resources/ports in the single band (configure, for example, a CSI-RS resource with 16 ports) regardless of a value reported as the certain parameter related to the BC. Therefore, appropriate CSI-RS resources/ports can be applied when the single band is applied, and thus it is possible to improve communication quality.

Note that the second aspect may be employed in a case where a plurality of certain parameters related to the BC are reported (e.g., the first aspect).

Figure 18:
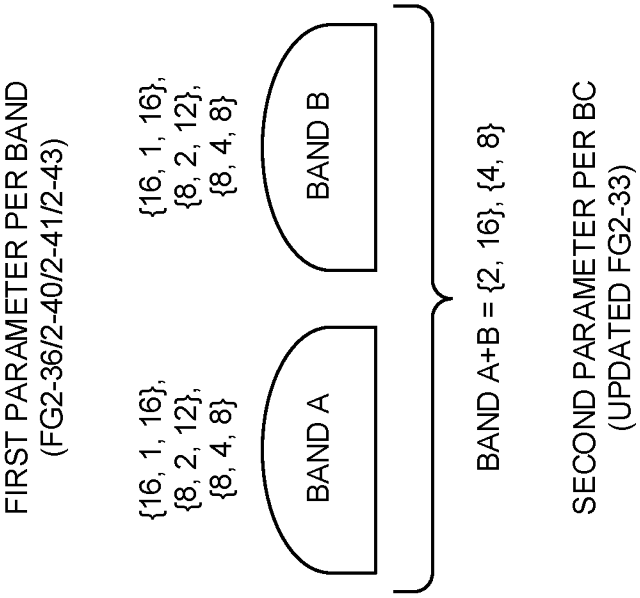
FIG. 18 is a diagram to show another example of the number of CSI-RS resources/the number of CSI-RS ports reported by the UE according to the second aspect.

FIG. 18 shows a case where {16, 1, 16}, {8, 2, 12}, and {8, 4, 8} are each reported as the parameter (e.g., FG2-36/2-40/2-41/2-43)/triplet related to the codebook corresponding to band A and band B, and {2, 16} and {4, 8} are reported as the certain parameter (e.g., FG2-33) related to the BC corresponding to the band combination (band A+B).

When single band A or single band B is applied or configured, the network may configure at most one CSI-RS resource including a total of 16 ports, at most two CSI-RS resources including a total of 12 ports, or at most four CSI-RS resources including a total of 8 ports. When the single band is configured, the UE may ignore the certain parameter related to the BC.

When the band combination (band A+B) is applied or configured, the network may configure at most two CSI-RS resources including a total of 12 ports (e.g., 6 ports for band A+6 ports for band B). Alternatively, the network may configure at most four CSI-RS resources including a total of 8 ports (e.g., 4 ports for band A+4 ports for band B).

Thus, the CSI-RS resources/ports are configured on the basis of the parameter/triplet reported per band without being limited to the parameter (e.g., FG2-33) related to the BC in a case of the single band, and thus it is possible to resolve issues such as the above-described case 1-2, case 1-3, case 2-3, and the like.

<Variations>

The UE may report, as a first parameter (e.g., FG2-36/2-40/2-41/2-43)/triplet reported per band, lists (e.g., two lists) including at least a case where a maximum value of CSI-RS resources is 1. In such a case, the UE may control so as not to report a plurality of combinations (e.g., so as to report one parameter) for a second parameter (e.g., FG2-33) reported per BC.

For example, assume a case where {1, 12} is reported as the second parameter related to the BC for band A+B. In such a case, the UE may judge one value of the number of CSI-RS resources (e.g., the number of corresponding ports or the like) on the basis of the first parameter/triplet reported per band. On the other hand, when one value of the number of CSI-RS resources is reported as the first parameter/triplet reported per band, a case where a case in which the number of CSI-RS resources is 1 ({1, x}) is reported as the second parameter related to the BC may not occur.

Note that the UE, when reporting three or more parameters (or lists) as the first parameter reported per band, may report the plurality of the combinations as the second parameter related to the BC.

For example, the UE assumes a case where reporting for band A and band B is performed as the first parameter reported per band, as described below.

Band A: {16, 1, 16}, {8, 2, 10}

Band B: {16, 1, 16}, {8, 2, 10}, {4, 3, 8}

In such a case, when only one parameter can be reported as the second parameter reported per BC, only either of {3, 8} or {2, 10} can be reported. In this case, {2, 10} is unconfigurable when only {3, 8} is reported, and {3, 8} is unconfigurable when {2, 10} is reported. Thus, when N (e.g., three) of first parameters/lists are reported as the single band, N−1 (e.g., two) of second parameters may be reported.

Therefore, it is possible to flexibly control a configuration of CSI-RS resources/ports in both of the single band and multiple bands.

<Method for Determining Certain Parameter Related to BC>

A parameter related to a maximum number of CSI-RS resources (e.g., maxNumberSimultaneousNZP-CSI-RS-ActBWP-AllCC) and a parameter related to a total number of ports (e.g., totalNumberPortsSimultaneousNZP-CSI-RS-ActBWP-AllCC) reported per BC may be determined on the basis of the parameter (e.g., FG2-36/2-40/2-41/2-43)/triplet reported per band.

When a plurality of triplets are reported for a certain band, the maximum number of CSI-RS resources reported per BC may be configured to the same as the largest value of a plurality of the numbers of CSI-RS resources included in the plurality of the triplets.

For example, the UE assumes a case where reporting for band A and band B is performed as the first parameter reported per band, as described below.

Band A: {16, 1, 16}, {8, 2, 10}

Band B: {16, 1, 16}, {8, 2, 10}, {4, 3, 8}

In such a case, the maximum number of CSI-RS resources reported per BC may be configured to 3. The total number of ports reported per BC may be configured to 8.

This case shows a case where a value corresponding to a maximum number of the numbers of CSI-RS resources (here, 3) reported per band is configured for the number of ports reported per BC, but the present disclosure is not limited to this. Combinations of a maximum number of CSI-RS resources reported per band and a total number of ports reported per band may each be selected from different lists instead of being selected from one list.

(Third Aspect)

In a third aspect, a method for applying a certain parameter (e.g., updated FG2-33) related to a BC will be described.

An enhancement function for the certain parameter (e.g., updated FG2-33) related to the BC shown in the first aspect may be employed as a UE capability of Rel. 16.

Alternatively, the enhancement function may be employed as a UE capability of Rel. 15. In this case, in order to ensure backward compatibility with a terminal not including the enhancement function (or avoid change without the backward compatibility), the following structure may be employed.

A new UE may notify a capability per legacy band with conservative numbers, may notify a capability of a new band with braver numbers, and may signal capability per new BC used for only an inter-band CA case. In this case, the old base station may read the capability per legacy band with the conservative numbers. A new base station may ignore the capability per legacy band, may read the capability per new band with the braver numbers, and may read the capability per new BC for the inter-band CA case.

An old UE may signal only the capability per legacy band with conservative numbers. In this case, the old base station may read the capability per legacy band with the conservative numbers. The new base station may read the capability per legacy band with the conservative numbers.

All UEs directly report legacy signaling in order to ensure the backward compatibility, but the new UE may additionally report capability signaling per new band and capability signaling per BC for a parameter (e.g., FG2-36/2-40/2-41/2-43) related to a codebook.

(Fourth Aspect)

In a fourth aspect, a method for interpreting a certain parameter (e.g., updated FG2-33) related to a BC reported by a UE will be described.

Figure 19:
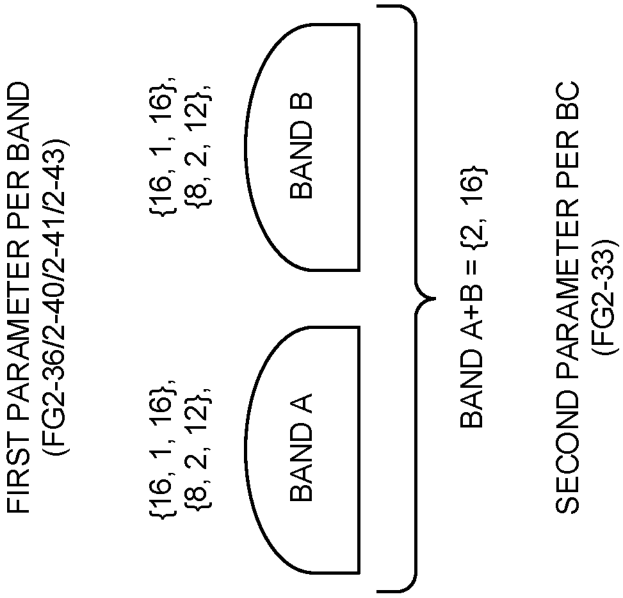
FIG. 19 is a diagram to show an example of the number of CSI-RS resources/the number of CSI-RS ports reported by a UE according to a fourth aspect.

Assume a case where the UE performs reporting of band A and band B as a first parameter/triplet related to a codebook, as described below, and performs reporting of band A+B as a certain parameter related to a BC as described below (see FIG. 19).

Band A: {16, 1, 16}, {8, 2, 12}

Band B: {16, 1, 16}, {8, 2, 12}

Band A+B: {2, 16}

In such a case, a network can configure one CSI-RS for band A, and can configure one CSI-RS for band B. In such a case, the number of CSI-RS ports corresponding to each CSI-RS resources may be interpreted as either of interpretation 1 or interpretation 2 below.

<Interpretation 1>

The UE may interpret a total of 12 ports as being supported in whole band A+B. This is because reported values for band A or band B are {8, 2, 12}, reported ground values for band A+B are {2, 16}, and a total of 12 ports are assumed for band A+B with a limit for lower values (here, values "2, 12" with a smaller number of ports).

<Interpretation 2>

The UE may interpret a total of 16 ports as being supported in whole band A+B. This is because reported values for band A or band B are {16, 1, 16}, reported values for band A+B are {2, 16}, and a total of 16 ports are assumed for band A+B with a limit for lower values (here, values "1, 16" with a smaller number of resources).

When the interpretation 2 is employed, even when a total number of the numbers of ports included in a second parameter related to the BC is configured so that the total number of the numbers of the ports is lower than a total number of the numbers of ports included in the first parameter, it is possible to support the total number of the numbers of ports included in the first parameter for one band in the BC.

(Fifth Aspect)

In a fifth aspect, a case where information related to a maximum number of ports for each resource for a BC is reported and a plurality of parameters (or a combination of parameters) (e.g., FG2-33) are reported as parameters related to a band combination will be described.

A UE may report, as certain parameters related to the BC, a maximum number of CSI-RS resources (e.g., maxNumberResourcesPerBC) and a total number of ports for CSI-RS resources (e.g., totalNumberTxPortsPerBC). The UE may report a maximum number of ports per resource related to the BC (or per BC) (e.g., maxNumberTxPortsPerResource or maxNumberTxPortsPerResourceperBC).

The maximum number of CSI-RS resources (e.g., maxNumberResourcesPerBC) may be interpreted as a maximum number of CSI-RS resources in all CCs/active BWP (e.g., maxNumberSimultaneousNZP-CSI-RS-ActBWP-AllCC). The total number of ports for CSI-RS resources (e.g., totalNumberTxPortsPerBC) may be interpreted as a total number of ports for CSI-RS resources in all CCs/active BWP (e.g., totalNumberPortsSimultaneousNZP-CSI-RS-ActBWP-AllCC).

As the certain parameter (e.g., FG2-33) related to the BC, a report/list of one or more (or a plurality of) combinations may be supported (or allowed). As the maximum number of ports per resource related to the BC, one or more (or a plurality of) reports/lists may be supported (or allowed).

The UE may control delivery of UE capability information reported per BC by using at least one of reporting method 5-1 to reporting method 5-2 below.

<Reporting Method 5-1>

Figure 20:
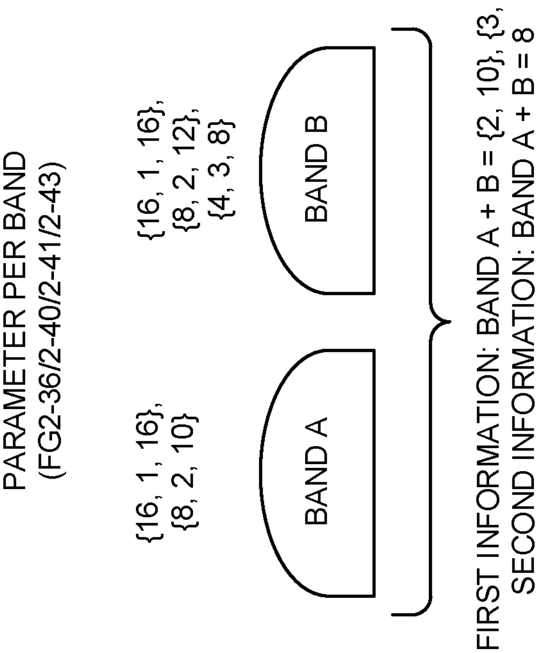
FIG. 20 is a diagram to show an example of reporting of the number of ports for each CSI resource/the number of CSI-RS resources/the number of CSI-RS ports for a BC according to a fifth aspect.

For example, the UE may report, per BC/per CSI codebook type, one or more combinations of {maxNumberResourcesPerBC, totalNumberTxPortsPerBC} and the maximum number of ports per resource (maxNumberTxPortsPerResource) (see FIG. 20). FIG. 20 shows a case where a plurality of certain parameters (also referred to as updated FG2-33 or enhanced FG2-33) and a parameter related to the maximum number of ports per resource are reported separately or independently.

FIG. 20 shows a case where the UE reports parameters (e.g., FG2-36/2-40/2-41/2-43)/triplets related to a codebook for band A and band B, as described below.

Band A: {16, 1, 16}, {8, 2, 10}

Band B: {16, 1, 16}, {8, 2, 12}, {4, 3, 8}

In this case, FIG. 20 shows a case where the UE reports two certain parameters (e.g., updated FG2-33)/lists related to the BC (here, band A+B), as described below. Of course, the reported combinations are not limited to two, and may be three or more. Band A+B (first information): {maxNumberResourcesPerBC, totalNumberTxPortsPerBC}={2, 10}, {3, 8}

Band A+B (second information): maxNumberTxPortsPerResource=8

The UE may separately report the first information (here, {2, 10}, {3, 8}) and the second information (here, 8). For example, the UE may report the first information and the second information by using different bits (for example, capability bits). A plurality of combinations (here, {2, 10}, {3, 8}) included in the first information may be reported as a separate list.

Thus, the first information and the second information are reported separately, thereby allowing the amount of signaling to be reduced, as compared to that in a case where triplets themselves reported per band are reported per BC.

<Reporting Method 5-2>

For example, the UE may report, per BC/per CSI codebook type, one or more combinations of {maxNumberResourcesPerBC, totalNumberTxPortsPerBC} and the maximum number of ports per resource (maxNumberTxPortsPerResource) (see FIG. 21). FIG. 21 shows a case where the plurality of certain parameters (also referred to as updated FG2-33 or enhanced FG2-33) and the parameter related to the maximum number of ports per resource are reported with use of the same list.

FIG. 21 shows a case where the UE reports parameters (e.g., FG2-36/2-40/2-41/2-43)/triplets related to a codebook for band A and band B, as described below.

Band A: {16, 1, 16}, {8, 2, 10}

Band B: {16, 1, 16}, {8, 2, 12}, {4, 3, 8}

In this case, FIG. 21 shows a case where the UE reports the certain parameters (e.g., updated FG2-33) related to the BC (here, band A+B) and the parameter related to the maximum number of ports per resource by using one list. Of course, the reported combinations are not limited to this.

Band A+B (first information): $\{X, (Y_1, Z_1), (Y_2, Z_2)\}$

X: maxNumberTxPortsPerResource

Y: maxNumberResourcesPerBC (or maxNumberSimultaneousNZP-CSI-RS-ActBWP-AllCC)

Z: totalNumberTxPortsPerBC (or totalNumberPortsSimultaneousNZP-CSI-RS-ActBWP-AllCC)

In FIG. 21, the UE may report {8, (2, 10), (3, 8)} as capability information for the BC (here, band A+B). In this case, X corresponds to $(Y_1, Z_1)$, as well as to $(Y_2, Z_2)$. In other words, this case corresponds to a case where $(X, Y_1, Z_1)$, $(X, Y_2, Z_2)$ are reported.

Thus, the maximum number of ports per resource is commonly configured for a plurality of combinations of a maximum number of CSI-RS resources (e.g., maxNumberResourcesPerBC) and a total number of ports for CSI-RS resources (e.g., totalNumberTxPortsPerBC). Therefore, an increase in the amount of signaling can be suppressed even when a maximum number of ports per resource is reported per BC.

Note that for the maximum number of ports per resource, a plurality of values (for example, X1, X2) reported by the UE may be supported or allowed. For example, the number (or reported number) of pieces of information related to the maximum number of ports per resource to be reported is not limited to 1. The reported number related to the maximum number of ports per resource to be reported may be less than or equal to a reported number related to the plurality of combinations of a maximum number of CSI-RS resources (e.g., maxNumberResourcesPerBC) and a total number of ports for CSI-RS resources (e.g., totalNumberTxPortsPerBC).

(Sixth Aspect)

In a sixth aspect, a case where, as parameters related to a band combination, the same parameters as those of triplets (or parameters corresponding to triplets) are reported per BC and where some reports are not reported (or the reports are omitted) will be described.

A UE may report, per BC/per CSI codebook type, a maximum number of ports per resource (e.g., maxNumberTxPortsPerResource or maxNumberTxPortsPerResourceperBC), a maximum number of CSI-RS resources (e.g., maxNumberResourcesPerBC), and a total number of ports for CSI-RS resources (e.g., totalNumberTxPortsPerBC).

For example, the UE may report, per BC/per CSI codebook type, {maxNumberTxPortsPerResource, maxNumberResourcesPerBC, totalNumberTxPortsPerBC}={X, Y, Z} by using one or more (or a plurality of) lists. As an example, the UE may report $(X_1, Y_1, Z_1)$, $(X_2, Y_2, Z_2)$, and $(X_3, Y_3, Z_3)$ as the parameters related to the BC. Of course, the number of reports (or the number of lists to be reported) is not limited to this.

The UE may not perform reporting of some reports (or parameters) out of a plurality of reports (e.g., parameters), or may omit the reporting. The omitted reporting may be a specific parameter (e.g., maxNumberTxPortsPerResource), or may be another parameter.

As an example, reporting of $X_2$, $X_3$ out of $(X_1, Y_1, Z_1)$, $(X_2, Y_2, Z_2)$, and $(X_3, Y_3, Z_3)$ may be omitted, and $(X_1, Y_1, Z_1)$, $(-, Y_2, Z_2)$, and $(-, Y_3, Z_3)$ may be reported. The non-reported values (or parameters) may be interpreted on the basis of a certain condition/certain rule.

For the non-reported values (or parameters), a network (e.g., a base station) may assume a certain value on the basis of the certain condition/certain rule.

For example, the certain value may be another value reported per BC. When the UE reports ($X_1$, $Y_1$, $Z_1$), (-, $Y_2$, $Z_2$), and (-, $Y_3$, $Z_3$), parameters omitted in reporting (here, $X_2$, $X_3$) may be interpreted as the same value as $X_1$. When a plurality of Xs are reported, a value of X omitted in reporting may be determined in consideration of a relationship with another parameter Y/Z.

Alternatively, the certain value may be determined on the basis of a combination of (x, y, z) (e.g., triplets) reported per band. When the UE reports ($X_1$, $Y_1$, $Z_1$), (-, $Y_2$, $Z_2$), and (-, $Y_3$, $Z_3$), parameters omitted in reporting (here, $X_2$, $X_3$) may be determined in consideration of a combination of ($x_1$, $y_1$, $Z_1$), ($x_2$, $y_2$, $z_2$), and ($x_3$, $y_3$, $z_3$), . . . reported per band. For example, the certain value may be determined in consideration of a relationship between a value of x and a value of y/z reported per band.

Alternatively, the UE may omit reporting of a combination (or list) corresponding to a single band. For example, the UE may omit reporting (e.g., (X, 1, Z)) with a maximum number of CSI-RS resources per BC (e.g., maxNumberResourcesPerBC) being 1. This is because (X, 1, Z) corresponds to the single band and is less necessary for reporting in the BC.

Therefore, transmission of some reports (or parameters) is omitted, thereby allowing an increase in a size of information (e.g., a higher layer message) reported by the UE to be suppressed even when a maximum number of ports per resource is reported.

(Variations)

When a maximum number of transmission ports per resource (maxNumberTxPortsPerResource) is reported per BC, rule 1 or rule 2 below may be employed.

<Rule 1>

A maximum number of transmission ports in a CSI-RS resource for a certain band may be with a value of maxNumberTxPortsPerResource reported per band being an upper limit value, and may additionally be limited to a value reported per BC or less.

<Rule 2>

A maximum number of transmission ports in a CSI-RS resource for a certain BC may be with an inter-band total value of maxNumberTxPortsPerResource reported per band being an upper limit value, and may additionally be limited to a value reported per BC or less.

The maximum number of transmission ports per resource (maxNumberTxPortsPerResource) corresponds to a maximum number of transmission ports in a certain CSI-RS, and thus which band a maximum number of transmission ports in the CSI-RS is for may be unknown when the maximum number of the transmission ports is reported per BC. Thus, employing rule 1 or rule 2 below can solve such an issue.

<Reporting of UE Capability>

The UE may report, to the network, at least some elements included in triplets as a part of a UE capability with respect to whether a capability to perform reporting per BC is supported. A capability bit/parameter to report about whether the capability can be supported is allowed may be defined. Alternatively, the network may judge about whether the capability can be supported on the basis of a structure, a configuration, or a value of a report per band/per BC reported from the UE.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 22:
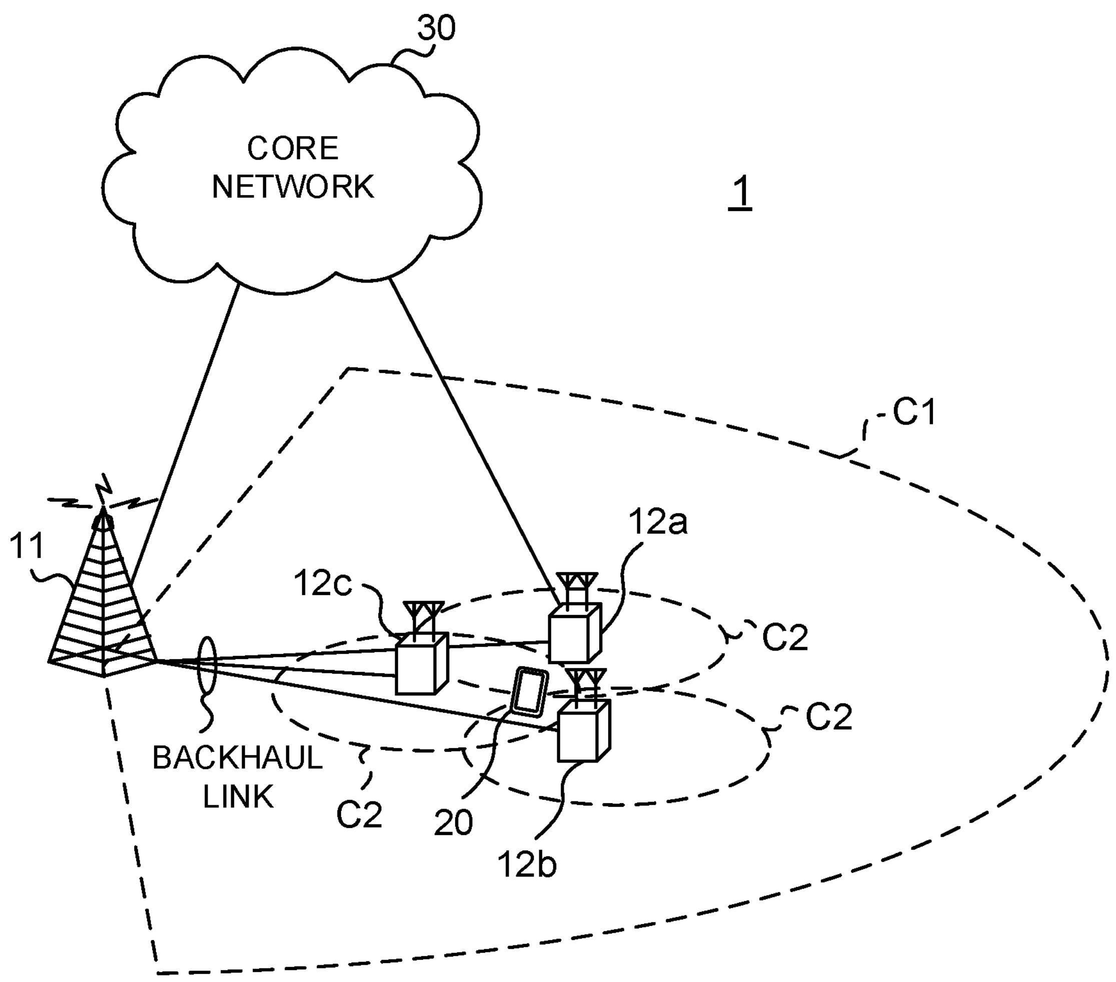
FIG. 22 is a diagram to show an example of a schematic structure of a radio communication system according to one embodiment.

FIG. 22 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (LAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 23:
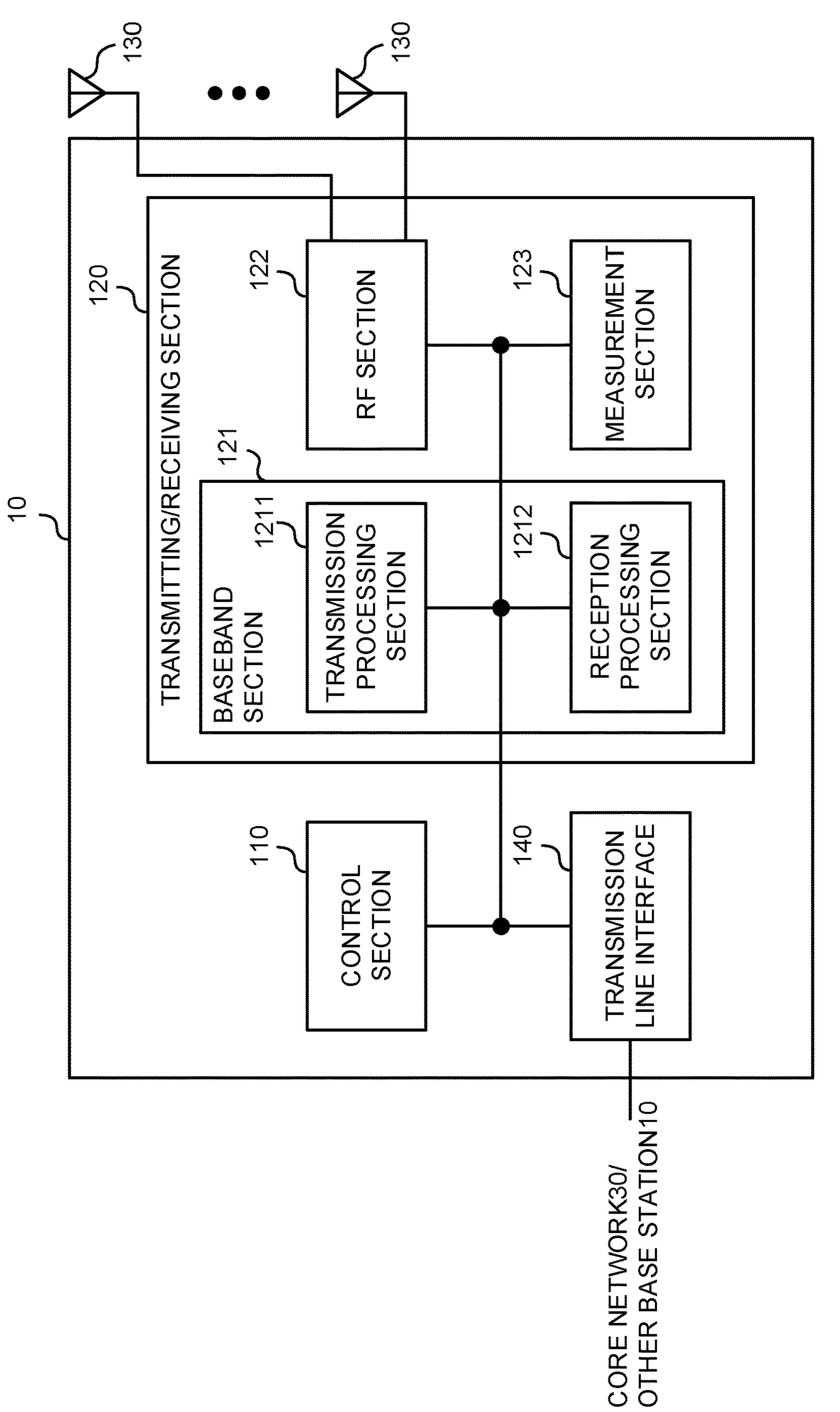
FIG. 23 is a diagram to show an example of a structure of a base station according to one embodiment.

FIG. 23 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may receive a plurality of pieces of first information related to a combination of a channel state information resource for a band combination and the number of ports for the band combination and second information related to the number of ports per channel state information resource for the band combination.

The control section 110 may control transmission of a channel state information reference signal on the basis of the first information and the second information.

(User Terminal)

Figure 24:
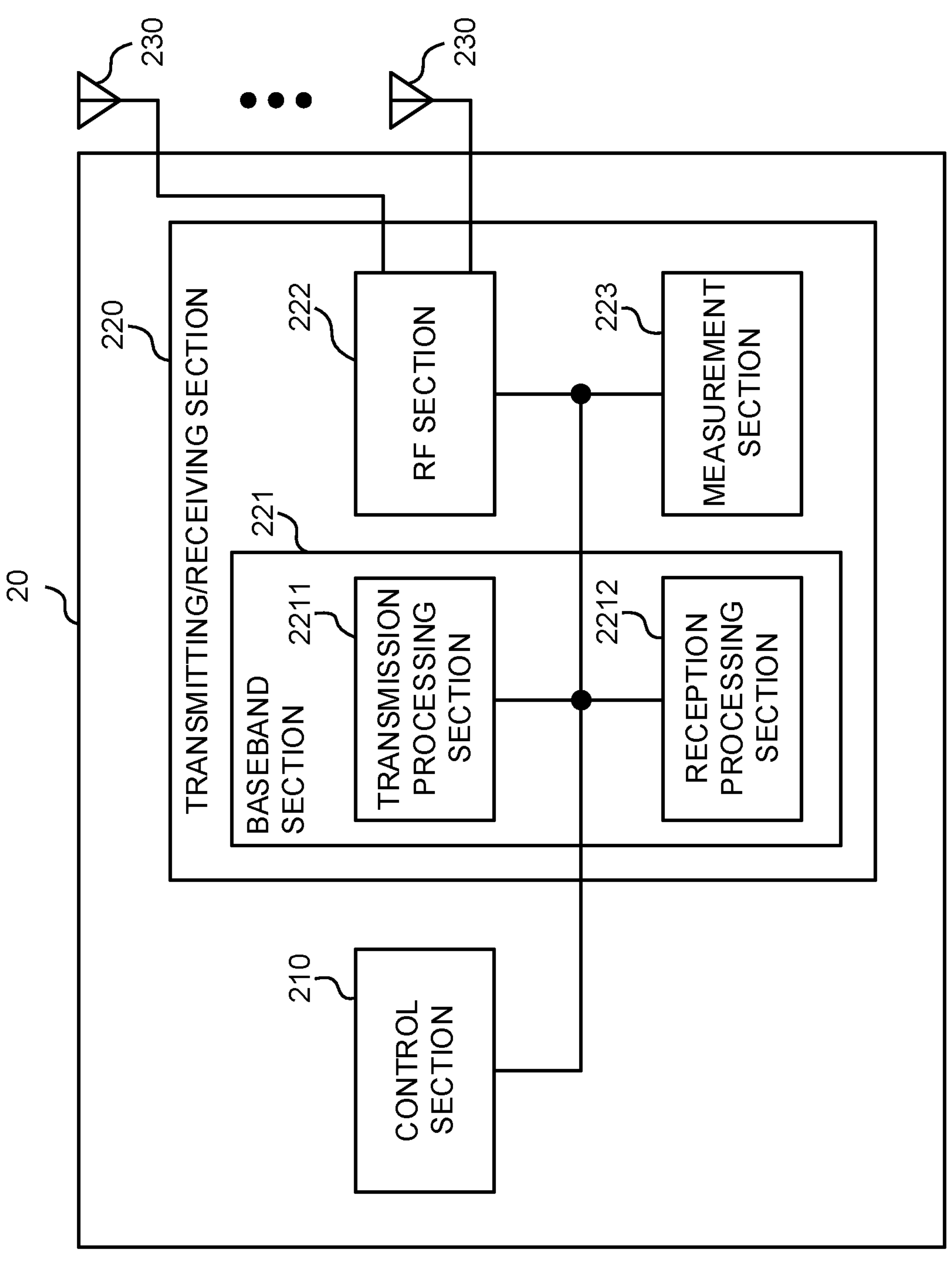
FIG. 24 is a diagram to show an example of a structure of a user terminal according to one embodiment.

FIG. 24 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may transmit a plurality of pieces of first information related to a combination of a channel state information resource for a band combination and the number of ports for the band combination and second information related to the number of ports per channel state information resource for the band combination.

The control section 210 may control reporting of a plurality of pieces of first information related to a combination of a channel state information resource for a band combination and the number of ports for the band combination and second information related to the number of ports per channel state information resource for the band combination.

The control section 210 may control to separately report the first information and second information. Alternatively, the control section 210 may control to perform the reporting by including the first information and second information in a same list.

The control section 210 may control reporting of a plurality of pieces of information related to a combination of the number of ports per channel state information resource for a band combination, a channel state information resource for the band combination, and the number of ports for the band combination. Furthermore, the control section 210 may control not to report the number of ports per channel state information resource for the band combination in at least one piece of the plurality of pieces of information.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 25:
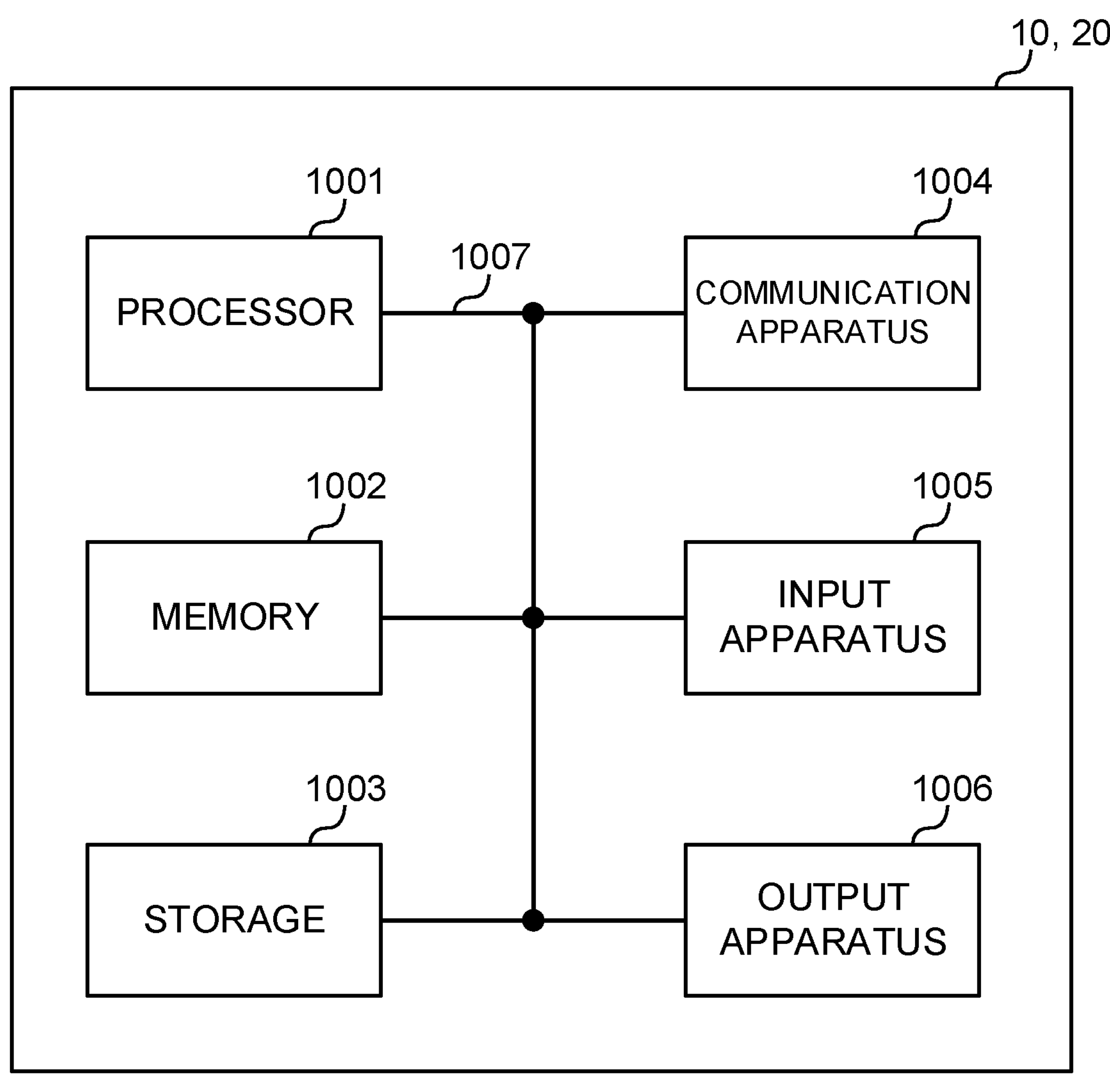
FIG. 25 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 25 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2020-074780 filed on Apr. 20, 2020. The entire contents of the application are herein incorporated.

What is claimed is:

1. A terminal comprising:

a processor that controls to report, for each band combination among a plurality of band combinations, a parameter including a combination of a maximum number of simultaneous channel state information-reference signal (CSI-RS) resources in active bandwidth parts (BWPs) of all component carriers (CCs) and a total number of CSI-RS ports for the simultaneous CSI-RS resources in the active BWPs of the all CCs and a parameter including a maximum number of ports per resource; and a transmitter that transmits the parameter including the combination and the parameter including the maximum number of ports per resource, wherein the processor controls to report, in a part of terminal capability, information about support of capability of reporting the maximum number of ports per resource for each band combination, wherein the processor supports reporting of a same maximum number of ports per resource for each and every band combination among the plurality of band combinations, where each band combination among the plurality of band combinations is a combination of a plurality of bands, and wherein the maximum number of ports per resource for the band combination is determined based on the combination of the maximum number of simultaneous CSI-RS resources and the total number of CSI-RS ports for the simultaneous CSI-RS resources reported per band.

2. A radio communication method for a terminal, comprising:

controlling to report, for each band combination among a plurality of band combinations, a parameter including a combination of a maximum number of simultaneous channel state information-reference signal (CSI-RS) resources in active bandwidth parts (BWPs) of all component carriers (CCs) and a total number of CSI-RS ports for the simultaneous CSI-RS resources in the active BWPs of the all CCs and a parameter including a maximum number of ports per resource; and transmitting the parameter including the combination and the parameter including the maximum number of ports per resource, wherein information about support of capability of reporting the maximum number of ports per resource for each band combination is controlled to be reported in a part of terminal capability, wherein reporting of a same maximum number of ports per resource for each and every band combination among the plurality of band combinations is supported, where each band combination among the plurality of band combinations is a combination of a plurality of bands, and wherein the maximum number of ports per resource for the band combination is determined based on the combination of the maximum number of simultaneous CSI-RS resources and the total number of CSI-RS ports for the simultaneous CSI-RS resources reported per band.

3. A system comprising a terminal and a base station, wherein the terminal comprises:

a processor that controls to report, for each band combination among a plurality of band combinations, a parameter including a combination of a maximum number of simultaneous channel state information-reference signal (CSI-RS) resources in active bandwidth parts (BWPs) of all component carriers (CCs) and a total number of CSI-RS ports for the simultaneous CSI-RS resources in the active BWPs of the all CCs and a parameter including a maximum number of ports per resource; and a transmitter that transmits the parameter including the combination and the parameter including the maximum number of ports per resource, and the base station comprises:

a receiver that receives the parameter including the combination and the parameter including the maximum number of ports per resource, wherein the processor of the terminal controls to report, in a part of terminal capability, information about support of capability of reporting the maximum number of ports per resource for each band combination, wherein the processor of the terminal supports reporting of a same maximum number of ports per resource for each and every band combination among the plurality of band combinations, where each band combination among the plurality of band combinations is a combination of a plurality of bands, and wherein the maximum number of ports per resource for the band combination is determined based on the combination of the maximum number of simultaneous CSI-RS resources and the total number of CSI-RS ports for the simultaneous CSI-RS resources reported per band.

* * * * *